United States Patent
Crane et al.

(10) Patent No.: US 11,170,493 B2
(45) Date of Patent: Nov. 9, 2021

(54) NON-CONTACT SYSTEM AND METHOD FOR DETECTING DEFECTS IN AN ADDITIVE MANUFACTURING PROCESS

(71) Applicant: University of South Florida, Tampa, FL (US)

(72) Inventors: Nathan Brad Crane, Vineyard, UT (US); James Randall Pierce, III, Clearwater, FL (US)

(73) Assignee: University of South Florida, Tampa, FL (US)

( * ) Notice: Subject to any disclaimer, the term of this patent is extended or adjusted under 35 U.S.C. 154(b) by 82 days.

(21) Appl. No.: 16/780,203

(22) Filed: Feb. 3, 2020

(65) Prior Publication Data

US 2020/0184632 A1    Jun. 11, 2020

Related U.S. Application Data

(63) Continuation of application No. PCT/US2018/045406, filed on Aug. 6, 2018.

(60) Provisional application No. 62/541,472, filed on Aug. 4, 2017, provisional application No. 62/650,727, filed on Mar. 30, 2018, provisional application No. 62/654,020, filed on Apr. 6, 2018.

(51) Int. Cl.
*G06K 9/00* (2006.01)
*G06T 7/00* (2017.01)
*G06T 7/586* (2017.01)
*B29C 64/118* (2017.01)
*B29C 64/273* (2017.01)

(52) U.S. Cl.
CPC .......... *G06T 7/0004* (2013.01); *B29C 64/118* (2017.08); *B29C 64/273* (2017.08); *G06T 7/586* (2017.01); *G06T 2207/10048* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,448,352 A | * | 9/1995 | Bouteyre | F17C 1/06 356/35.5 |
| 5,654,977 A | * | 8/1997 | Morris | G01N 25/72 374/4 |
| 5,711,603 A | | 1/1998 | Ringermachet et al. | |
| 6,690,016 B1 | * | 2/2004 | Watkins | G01N 25/72 250/341.7 |
| 8,204,294 B2 | * | 6/2012 | Alloo | G01N 25/72 382/141 |

(Continued)

OTHER PUBLICATIONS

International Search Report and Written Opinion of the International Searching Authority dated Oct. 23, 2018 for corresponding PCT International Application No. PCT/US18/45406.

(Continued)

*Primary Examiner* — Shervin K Nakhjavan
(74) *Attorney, Agent, or Firm* — Smith & Hopen, P.A.; Molly L. Sauter

(57) ABSTRACT

A Pulsed Thermography (PT) system and method is provided utilizing a long duration pulse in combination with a radiant heat shield as a non-destructive testing method for quantitatively measuring defect depths within a 3D printed part and for characterizing layer-by-layer surface defects in the 3D printed part.

27 Claims, 22 Drawing Sheets

(56) References Cited

U.S. PATENT DOCUMENTS

| | | | | |
|---|---|---|---|---|
| 8,577,120 | B1* | 11/2013 | Koshti | G06T 7/0004 |
| | | | | 382/141 |
| 9,897,561 | B2* | 2/2018 | Isakov | G01N 25/72 |
| 10,242,439 | B1* | 3/2019 | Koshti | G06T 7/11 |
| 2001/0050772 | A1* | 12/2001 | Meinlschmidt | G01N 25/72 |
| | | | | 356/430 |
| 2002/0128797 | A1* | 9/2002 | Sun | G01B 11/22 |
| | | | | 702/172 |
| 2003/0193987 | A1* | 10/2003 | Zalameda | G01N 25/72 |
| | | | | 374/5 |
| 2004/0051035 | A1* | 3/2004 | Zombo | G01N 25/72 |
| | | | | 250/252.1 |
| 2005/0186327 | A1* | 8/2005 | Saito | G01N 25/72 |
| | | | | 427/8 |
| 2006/0262971 | A1* | 11/2006 | Foes | G01N 25/72 |
| | | | | 382/141 |
| 2007/0041422 | A1* | 2/2007 | Shepard | G01N 21/171 |
| | | | | 374/124 |
| 2008/0053234 | A1* | 3/2008 | Staroselsky | G01N 25/72 |
| | | | | 73/649 |
| 2009/0028407 | A1* | 1/2009 | Seibel | A61B 1/0008 |
| | | | | 382/131 |
| 2009/0245321 | A1* | 10/2009 | Ringermacher | G01N 25/72 |
| | | | | 374/5 |
| 2010/0088041 | A1* | 4/2010 | Ringermacher | G01N 25/72 |
| | | | | 702/40 |
| 2016/0193790 | A1* | 7/2016 | Shuck | B22F 5/009 |
| | | | | 700/119 |
| 2016/0236414 | A1* | 8/2016 | Reese | B33Y 50/02 |
| 2017/0023505 | A1* | 1/2017 | Maione | G01M 5/0033 |
| 2017/0052070 | A1* | 2/2017 | Marsh | G01N 25/72 |
| 2018/0322623 | A1* | 11/2018 | Memo | G06N 3/084 |
| 2018/0326487 | A1* | 11/2018 | Casper | B23K 26/60 |

OTHER PUBLICATIONS

International Preliminary Report on Patentability dated Feb. 13, 2020 for corresponding PCT International Application No. PCT/US18/45406.

Gibson et al. Additive Manufacturing Technologies: 3D Printing, Rapid Prototyping, and Direct Digital Manufacturing Second Edition, Johnson Matthey Technol. Rev., 2015, 59, (3), 193-198.

Seppala et al. Infrared Thermography of Welding Zones Produced by Polymer Extrusion Additive Manufacturing, Additive Manufacturing, 12 (2016) 71-76.

Sun, J.G. Analysis of pulsed thermography methods for defect depth prediction, J. Heat Transf. Apr. 2006, vol. 128, pp. 329-338.

Parker et al. Flash Method of Determining Thermal Diffusivity, Heat Capacity, and Thermal Conductivity, J. Appl. Phys., 32 (1961) 1679-1684.

Shepard et al. Reconstruction and Enhancement of Active Thermographic Image Sequences, Opt. Eng., May 2003, 42 (5) 1337-1342.

Acrylonitrile Butadiene Styrene (ABS) Typical Properties Generic ABS. Originally retrieved May 4, 2017, https://plastics.ulprospector.com/generics/1/c/t/acrylonitrile-butadiene-styrene-abs-properties-processing. Last accessed Apr. 23, 2020.

Huang et al. Additive Manufacturing and its Societal Impact: A Literature Review, Int J Adv Manuf Technol (2013) 67:1191-1203.

* cited by examiner

| ABS | | | |
|---|---|---|---|
| BOUNDARY CONDITIONS | | | |
| INSULATED | ALL 4 SIDES AND BOTTOM | | |
| RADIATION | EMISSIVITY 0.9 | ATM. TEMPERATURE 298K | VIEW FACTOR 1.0 |
| CONVECTION | | COEF. FOR AIR 10.45 | ATM. TEMPERATURE 298K |
| HEAT POWER | VARIABLE STEP FUNCTION PULSE LENGTH ON THE SURFACE | | |

NON-CONTACT SYSTEM AND METHOD FOR DETECTING DEFECTS IN AN ADDITIVE MANUFACTURING PROCESS

CROSS REFERENCE TO RELATED APPLICATIONS

This application is a continuation of and claims priority to International Patent Application No. PCT/US2018/045406, entitled "NON-CONTACT SYSTEM AND METHOD FOR DETECTING DEFECTS IN AN ADDITIVE MANUFACTURING PROCESS," filed Aug. 6, 2018 which claims priority to U.S. Provisional Patent Application Ser. No. 62/541,472, entitled "NON-CONTACT SYSTEM AND METHOD FOR DETECTING DEFECTS IN AN ADDITIVE MANUFACTURING PROCESS," filed Aug. 4, 2017, U.S. Provisional Patent Application Ser. No. 62/650,727, entitled "SYSTEM AND METHOD FOR THERMAL DETECTION OF SUBSURFACE DEFECTS UTILIZING LONG THERMAL INPUT PULSES," filed Mar. 30, 2018, and U.S. Provisional Patent Application Ser. No. 62/654,020, entitled "SYSTEM AND METHOD FOR THERMAL DETECTION OF SUBSURFACE DEFECTS UTILIZING LONG THERMAL INPUT PULSES," filed Apr. 6, 2018, the contents of each of which are hereby incorporated by reference into this disclosure.

BACKGROUND OF THE INVENTION

In recent years, there has been a tremendous amount of research into improving the manufacturability of materials into final products using Additive Manufacturing (AM). The main advantages of additive manufacturing are the minimizing of waste material, as it is an additive process, as well as the ability to create custom, low-volume, products without the need for creation of expensive tooling or programming before the manufacturing process begins.

Because of these advantages, however, AM is susceptible to unique challenges in the quality side of manufacturing. These challenges include minimizing and detecting defects during the build of the parts.

The initial focus of most methods in the literature address process monitoring, in addition to mechanical and thermal property control, which is critical to ensure the process is optimized, thus increasing the percentage of successful builds. In AM, as with other manufacturing processes however, there are possibilities of uncontrolled parameters, such as voids, foreign inclusions and lack of fusion between layers or tracks that can cause internal defects in the parts themselves. Such defects could lead to decreased mechanical properties and possible part failure. Additionally, there may be systematic error due to peculiarities of the geometry of the control algorithms that are not readily detected, due to the low volume AM production. Therefore, nondestructive methods for detecting defects are crucial for maximizing quality control in additively manufactured parts. With the improvements of process monitoring and control, research has shifted to nondestructive testing and defect detection.

Whether it is waste, failed builds or part failure in the field due to defects, as additive manufacturing continues to expand into the manufacturing industry the need for quality inspection of these builds must expand as well.

Accordingly, what is needed in the art is a system and method for nondestructive testing and online process monitoring of Additive Manufacturing (AM) processes that assures product quality.

SUMMARY OF INVENTION

In various embodiments, the present invention provides a non-destructive evaluation (NDE) system and method based on Pulsed Thermography (PT) for the detection of surface characteristics and defects in a 3D printed part made from a thermoplastic material, such as acrylonitrile butadiene styrene (ABS). Due to the process speed and surface sensitivity, PT can be integrated into a 3D printing system to permit layer-by-layer inspection, without drastically increasing overall build times. Integration of the PT defect detection mechanism allows for online process monitoring of each layer, thereby adding the ability to log defects and make printing corrections, in-situ. This additional process control can ultimately minimize the number of defects within a final structure and improve the quality and reliability of the printed parts.

In one embodiment, the present invention provides a method for monitoring a layer-based manufacturing process, which includes, exposing a surface layer of a 3D part undergoing a layer-based manufacturing to a thermal energy pulse from a thermal energy source, the thermal energy pulse having a pulse duration that is a function of one or more properties of a material of the 3D part, measuring a surface temperature of the surface layer of the part with an infrared (IR) camera, in response to absorption of the thermal energy pulse into the 3D part, to identify a location of a subsurface defect in the 3D part and calculating a depth of the subsurface defect in the 3D part.

In one embodiment, calculating a depth of the subsurface defect in the 3D part may be accomplished using a peak temperature contrast slope method. In another embodiment, calculating a depth of the subsurface defect in the 3D may be accomplished using a log second derivative method.

In the peak temperature contrast slope method for calculating a depth of the subsurface defect, the method may include, measuring a surface temperature above a defect-free area of the 3D part, measuring a surface temperature above a defect area of the 3D part, determining a peak temperature contrast slope time based upon the surface temperature above a defect-free area and the surface temperature above a subsurface defect. and wherein calculating a depth of the subsurface defect in the 3D part, further comprises calculating the depth of the subsurface defect based upon the peak temperature contrast slope time, wherein the peak temperature contrast slope time is directly proportional to the square of the depth of the subsurface defect.

In various embodiments, the pulse duration may be a range of pulse durations and the range may be between about 100 ms and about 400 ms. Additionally, the pulse duration may be based upon a thermal diffusivity of the part and a depth of the subsurface defect being detected.

In an additional embodiment, the method of the present invention may include detecting surface defects on the 3D part, layer-by-layer, during the layer-based manufacturing process. In this embodiment, the method may include, orienting the thermal energy source and the IR camera to minimize specular reflections from a defect-free (smooth) surface area of the 3D part from reaching the IR camera, in response to the thermal energy pulse, blocking the thermal energy pulse from the part following exposing the surface layer of a 3D part undergoing additive manufacturing to the thermal energy pulse and detecting specular reflections from a layer of the 3D part at the IR camera to identify a location of a surface defect on the layer of the 3D part.

The methods of the present invention may be used in various layer-based manufacturing processes, including, but not limited to, Fused Deposition Modeling (FDM), Powder Bed Fusion (PBF) and Binder Jetting (BJ). They may also be applicable to defect detection in processes that deposit a single layer of material.

In another embodiment, the method may further include, calculating a thermal diffusivity of the part based upon one or more detected subsurface defects.

The present invention additionally provides for a system for monitoring layer-based manufacturing process, which includes, one or more thermal energy sources positioned to expose a surface layer of a 3D part undergoing layer-based manufacturing to a thermal energy pulse, the thermal energy pulse having a pulse duration that is a function of one or more properties of a material of the 3D part. In a particular embodiment, the one or more thermal energy sources are halogen bulbs. The system further includes, at least one infrared (IR) camera positioned to measuring a surface temperature of the surface layer of the part, in response to absorption of the thermal energy pulse into the 3D part, to identify a location of a subsurface defect in the 3D part and a processor for calculating a depth of the subsurface defect in the 3D part.

The IR camera may additionally be properly oriented to sense thermal reflections from the surface layer of the 3D part to detect surface defects on the 3D part. The processor may further be used for calculating a thermal diffusivity of the part based upon one or more reference features of known location in the part.

Accordingly, the present invention provides a non-contact system and method for detecting surface and subsurface defects in layer-based manufactured thermoplastic part. As such, the present invention provides an improved system and method for detecting defects in 3D-printed parts during the manufacturing process.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

Figure 1A:
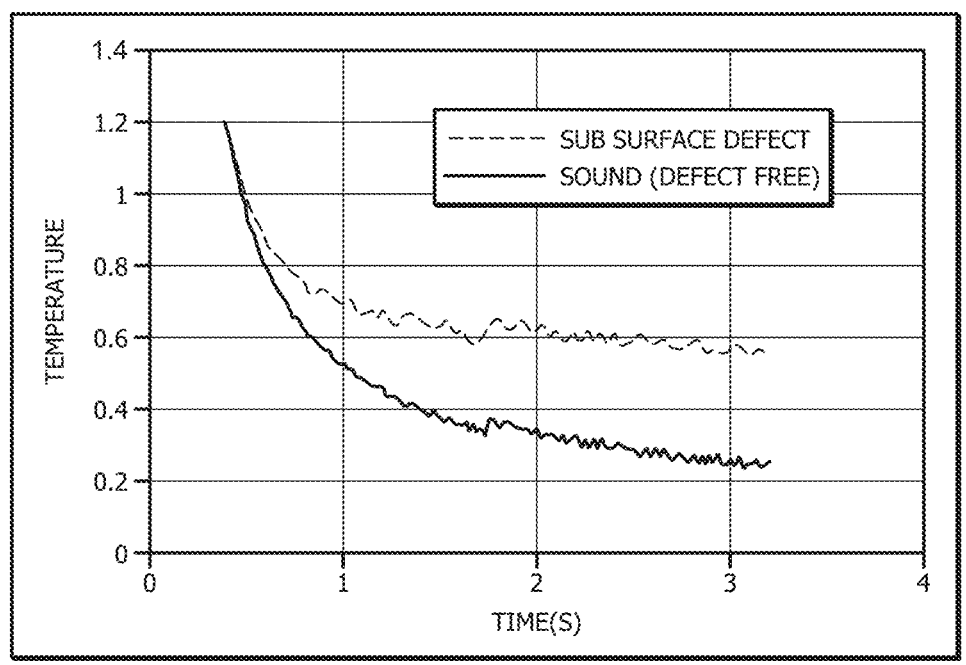
FIG. 1A is an illustration of the surface temperature decay curve of a sound (defect free) area of the part versus an area with a subsurface defect.

In various embodiments, the present invention provides a system and method for layer-by-layer quality assessment of an Additive Manufacturing (AM) process, such as components manufactured by Fused Deposition Modeling (FDM). The present invention provides a nondestructive testing method, utilizing a longer than typical pulse length, to assess additively manufactured parts for surface and subsurface defect detection as well as thermal property determination based on a known void depth.

Various additive manufacturing processes are known in the art, including Powder Bed Fusion (PBF), Binder Jetting (BJ) and Fused Deposition Modeling (FDM).

Powder Bed Fusion (PBF) is a type of additive manufacturing processes that fuses raw powder together layer-by-layer within a bed of powder to form a processed part. Different thermal sources including electron beams and lasers can be used to fuse the material, though the laser is most common. When a laser source is used, PBF is referred to as Laser Sintering (LS). In LS, powder is spread, layer-by-layer, on the bed either by a blade or a counter-clockwise rotating cylinder. The layer thickness is typically 100 µm. Upon completion of a newly spread layer, the powder is preheated and then the laser heats the layer to the dimensions of the specified cross section of the part. This process continues until a 3Dimensional part is formed. The types of materials that can be used is LS include plastics, ceramic, metal and glass powder. The benefits of LS are that there is no post curing of the powder required for proper strength and many parts can be built in a single build. An example of laser sintered parts being studied for final product use are air cooled heat exchangers for power plants.

Similar to PBF, Binder Jetting (BJ) utilizes a bed of powder to build the final part, however, instead of fusing the powder with a thermal source, BJ uses a binder to adhere the powder particles together. In BJ, a layer of powder is spread across the bed and then the print head drops binder droplets, approximately 80 µm in diameter, onto the part in the shape of the cross-section of the part being built. Besides the adhesion method between particles, BJ is also different in the fact that the freshly bound final part (green part) is quite fragile. Some binders require thermal post processing to achieve adequate handling strength. Once the binder is set, the part is removed from the powder bed and post processing can begin to increase the part strength or mechanical properties to the final desired specifications. Post processing is typically accomplished by infiltrating the part with a lower melting point infiltrant. For most steel powders, the infiltrant is bronze. For other material systems, epoxy and cyanoacrylate have been used. The most common material used in BJ is metal powder, though a notable application in the automotive industry is the use of BJ to make sand molds and cores for casting. Though post processing is most likely required, because the binder is added to the powder to create the part and many jets can be used simultaneously to deposit the binder, it should be noted that the BJ process is very fast compared to LS processing.

Fused Deposition Modeling (FDM) is an extrusion based additive manufacturing system. In FDM, a solid strand of material, the most common being Acrylonitrile Butadiene Styrene (ABS) and Polylactic Acid (PLA), are fed into and melted in the extruder head. The melted material is then forced through the extruder head onto the build platform. The extruded material is commonly known as "roads". The roads are laid in a rastering pattern to create a single layer. Since FDM is done on a build plate and the material is extruded onto the plate, either the plate or the extruder head must move the appropriate layer height before the process of extruding the next layer can begin. This process continues until the part is completely built. The benefit of FDM is the ability to create hollow, or cellularly structured parts with different infills. With powder-based processes, any hollow enclosure would be filled with raw powder. This is beneficial for reducing the mass of a part that may not undergo major external forces. Unlike powder-based process however, once the filament is extruded in FDM, it becomes waste material if not utilized on the part. The amount of waste material can be substantial.

Quality control is an essential process in manufacturing to ensure defect-free final products. For most large-volume manufacturing processes, destructive testing of a finite sample of products is a viable method for defect detection. Large production volumes allow for applying statistical process control techniques and the cost of destructive testing is small, as it is limited to a small percentage of the parts. This approach is not effective for additive manufacturing.

The layer-by-layer process of AM allows it to excel in parts with low volume and/or complex shapes. However, the process creates a challenging environment for quality control. The complex geometries complicate quality assessment and the low quantities make destructive testing for quality control much more expensive. Also because of the customizable nature and point localized material introduction with AM, many more defect types and locations are possible. In FDM for example there are over 35 factors that can influence geometrical accuracy set by the operator alone, withholding variation from the process itself.

While quality may be assessed based on monitoring the process conditions, current control methods may be insufficient to guarantee that the same parameter settings will consistently produce defect-free parts. Variations from input parameters as well as uncontrolled process and post-process variables may lead to variations between builds. These variations will affect all different types of AM technologies. For example, with powder-based processes, the powder particle size has normal variation. Thus, within each layer, density variation may occur due to variation in particle size distribution at each point when the powder layer is deposited.

Pulse Thermography (PT) applies a thermal pulse to the surface of a part and monitors the spatial variation in the surface temperature over time. Materials previously studied utilizing this method of defect detection include glass fiber reinforced polymers (GFRP) and aluminum (Al), 316 stainless steel, ceramic composites, and carbon fiber reinforced polymers (CFRP). In AM, PT could be applied for defect detection, layer-by-layer, or for subsurface defects after a couple layers have been laid. This in turn, creates the possibility for online repair if a defect is detected before completion, thereby reducing waste material.

In PT, a thermal energy pulse is applied to a small layer on the surface of the part. The surface temperature is then monitored with an infrared (IR) camera, as heat is dissipated via conduction into the structure of the part. The dissipation of the heat leads to a surface temperature decay over time and is expressed as:

$$T(t) = \frac{Q}{\rho C L}\left[1 + 2\sum_{n=1}^{\infty} \exp\left(-\frac{n^2\pi^2}{L^2}\alpha t\right)\right] \quad (1)$$

where Q is the total input energy, $\rho$ is the density of the part, C is the specific heat capacity of the material, $\alpha$ is the thermal diffusivity of the material and L is the thickness of the part being analyzed. The equation was derived with three major assumptions: no heat loss from surfaces of the part the thermal input is an instantaneous pulse (Dirac Pulse), and thus, there is a negligible internal temperature distribution after the pulse.

From this equation, experimental methods have been researched for the determination of the depth of the defect. A temperature contrast method is known for defect detection which compares the difference in temperature from a defective area, and a sound (defect free) area on the part being tested. In this method, the peak contrast temperature is proportional to the square of the defect depth. Stemming from the temperature contrast method, it has also been found that the derivative of the temperature contrast produces a peak that is proportional to the defect depth. The method is known as the peak contrast derivative method and the peak is present where the temperature change is greatest.

In various embodiments of the present invention, a peak contrast derivative time method is used to detect defects in a 3D manufactured part utilizing a long thermal energy pulse (>100 ms). The use of a long pulse serves to break down the key assumption of equation. (1), because the temperature distribution after the long pulse can no longer be approximated as a pure surface heating. Thus, a temperature profile within the part is assumed and the temperature profile is dependent upon the pulse duration and thermal properties of the part. Since the peak contrast derivative time method uses a comparison with a reference defect-free area on the part, the long pulse effects are minimized.

Figure 1B:
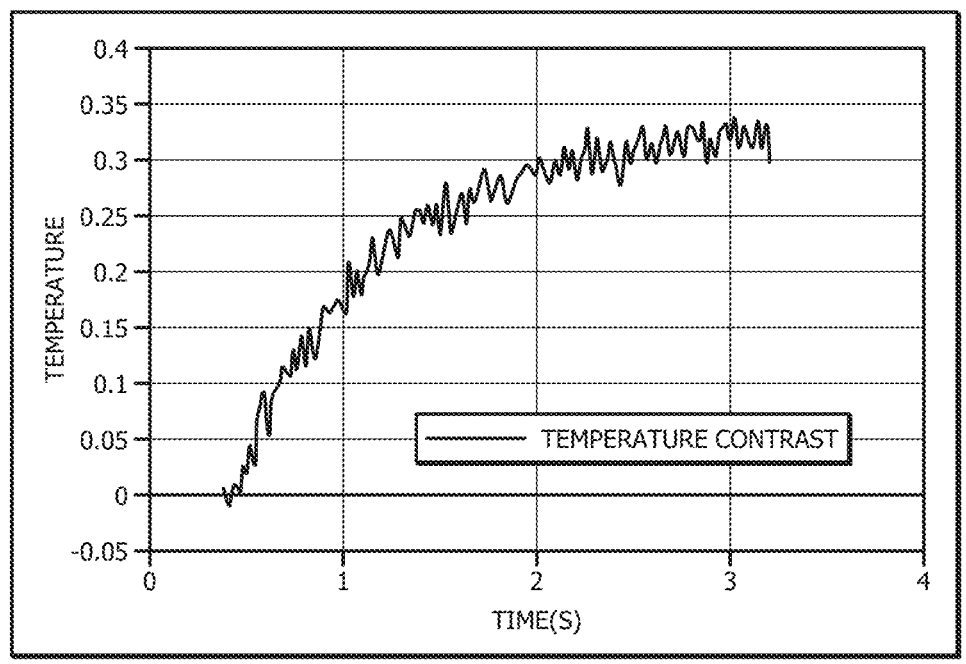
FIG. 1B is an illustration of the temperature difference between the defect area and the sound area of the part.

In PT, a pulse of energy is emitted onto the part across the front surface. Immediately following the pulse, thermal energy waves will propagate one-dimensionally down perpendicular to the surface, via conduction. This one-dimensional (1D) temperature distribution will continue through a defect-free part. However, when a large enough defect is present, the 1D conduction breaks down and 3D conduction begins to occur. The 3D conduction slows down the conduction process and creates a "hotspot" on the surface of the part above the location of the defect. Utilizing a peak contrast derivative time method, the temperature difference between a defect location and a reference defect-free area on the part is calculated. Calculation of the defect depth with this method requires a reference temperature distribution. If a reference area is not known then one must be determined or a different method must be used. It is known in the art to use the average temperature over the entire surface as the reference temperature. This approach works for relatively uniform surfaces with low levels of defects. Most defects generate a low thermal conductivity region where material is missing, or where bonding between layers is lost as in a delamination. When a defect is present within a part, the 3D conduction path around the defect slows heat transport from the surface and a change in the surface temperature decay is observed, as shown in FIG. 1A. This produces a temperature contrast over time, as shown in FIG. 1B, where temperature contrast is defined as the difference between the surface temperature over a defect compared to a sound region. The time the peak slope of this temperature contrast curve occurs is directly proportional to the square of the defect depth. The correlation between the defect depth and the peak slope time ($t_s$) is expressed as:

$$t_s = \frac{3.64 L^2}{\pi^2 \alpha} \quad (2)$$

where L is the defect depth. This method requires a reference sound area to calculate the temperature contrast and the reference sound temperature is taken as the average over the entire surface. This method works if the defect area is a small percentage of the total surface area of the part and the heating is uniform.

When the temperature and time is plotted in the logarithmic scale the ideal temperature decay curve is linear, with a slope of −0.5 as expressed as $$\ln(T(t)) = \ln\left(\frac{Q}{\sqrt{\pi \rho C \alpha}}\right) - \frac{1}{2}\ln(t) \quad (3)$$

Figure 2A:
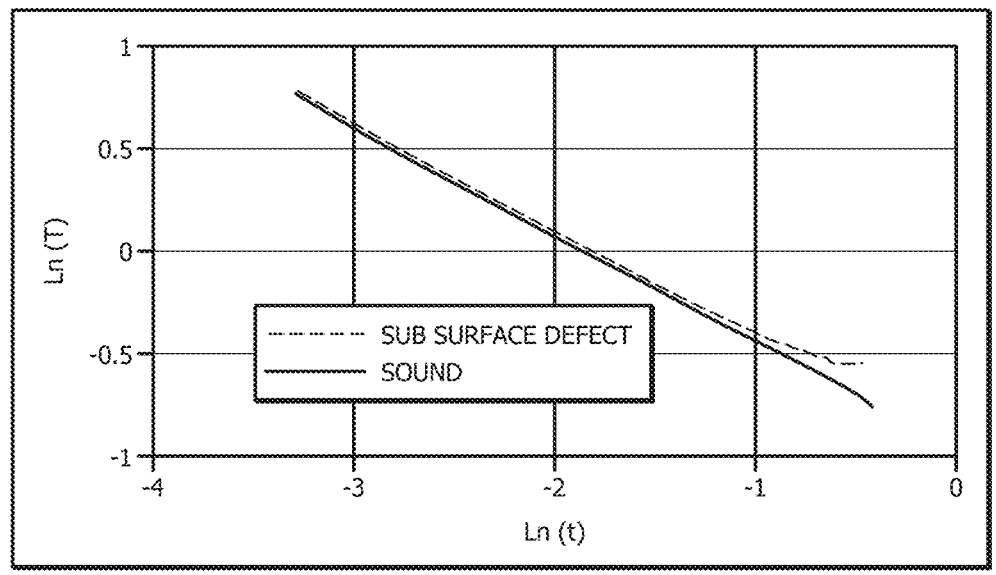
FIG. 2A is an illustration of temperature over time in the logarithmic scale of an area with a sub-surface defect and a sound area.
Figure 2B:
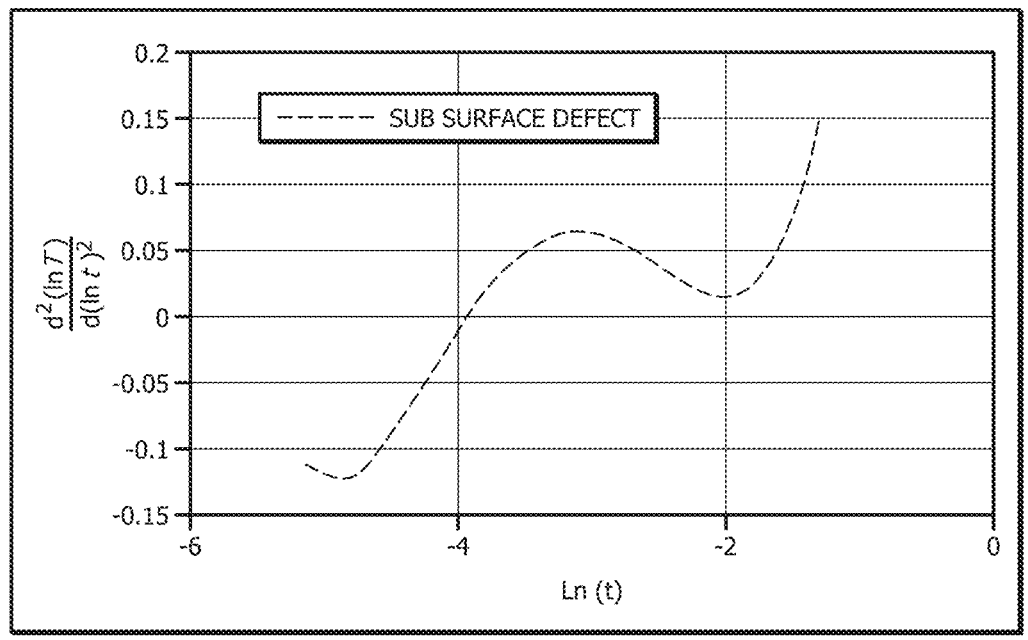
FIG. 2B is an illustration of the second derivative of the surface temperature decay where a defect is present in the log scale.

When a defect is present, the temperature in the log scale will deviate from the linear trend as seen in FIG. 2A. The second derivative of the log temperature of the defective region will produce a peak, as shown in FIG. 2B. The time where this peak occurs is proportional to the square of the defect depth. The equation for determining the defect depth from the peak second derivative time ($t_2$) is expressed as.

$$t_2 = \frac{L^2}{\pi \alpha} \quad (4)$$

Unlike the peak temperature contrast slope method, the log second derivative method does not require a reference sound area for determination of defect depth.

A non-dimensional measurement of the pulse length ($\tau$) can be obtained by dividing the pulse length ($t_p$) by the ($t_s$) and the ($t_2$) values for the peak temperature contrast and log second derivative methods, respectively.

For the peak temperature contrast method, the measured value of peak temperature can be used or equation (3) can be substituted to make predictions based on defect depths of interest, resulting in the following equation for the peak temperature contrast method:

$$\tau_s = \frac{t_p}{t_s} = \frac{\pi^2 \alpha t_p}{3.64 L^2} \quad (5)$$

Wherein, $\tau_s<0.7$ is preferred, $\tau_s<1$ is feasible, allowing a modest error impact, $\tau_s<1.5$ is acceptable with some corrections to the depth formula and $\tau_s<2$ is the absolute theoretical maximum for this depth calculation method.

For the log second derivative method, the measured value of the peak temperature can be used, or equation (4) can be substituted to make predictions based on defect depths of interest, resulting in the following equation for the log second derivative method:

$$\tau_2 = \frac{t_p}{t_2} = \frac{\pi \alpha t_p}{L^2} \quad (6)$$

Wherein, $\tau_2<0.7$ is preferred for negligible error impact, $\tau_2<1$ is acceptable, allowing a modest error impact, $\tau_2<1.5$ is feasible with some adjustments to the depth formula and $\tau_2<2$ is the absolute theoretical maximum for this depth calculation method.

Literature reports of these methods have focused on pulse lengths of 2-10 ms that closely approximate the instantaneous pulse assumption. For materials such as steel, these short pulses are required to accurately detect the peak slope. The pulse length required to approximate the instantaneous pulse assumption will depend on both the diffusivity of the material and the depth of the defect. Since thermal diffusivity of ABS and other thermoplastics ($\alpha \approx 1.2 \times 10^{-7}$) is much smaller than for steel ($\alpha \approx 4 \times 10^{-6}$), a longer pulse is possible. The time difference is in fact proportional to the thermal diffusivity differences. Pulse length may be increased further by relaxing the assumption of negligible internal temperature distribution.

Longer input pulses provide several measurement benefits. For example, a longer pulse allows a larger energy input into the system without having to change the power source or lamp. Higher energy dramatically increases the temperature change, which reduces the sensitivity to measurement noise. With a 4 kW power source, the energy input is 50 times larger with a 100 ms pulse than it would be a 2 ms pulse, thereby producing approximately a 50 times larger surface temperature contrast for the same material. For materials with large thermal diffusivities or shallow defects this may not be as critical, as the temperature signal is large enough to overcome thermal noise. However, for materials with small thermal diffusivities and when analyzing deeper defects, the ability to simply adjust the pulse time to increase the energy allowing for a larger temperature signal is quite appealing. Additionally, longer pulses can be achieved with standard halogen lighting without the expense of a high-power pulsed voltage source.

The ability to use a longer pulse is especially attractive in nontraditional applications for low thermal diffusivity materials such as polymers and powders. These applications are of particular interest in the Additive Manufacturing (AM) of metal components via powder processes because thermal conductivity of powder beds is significantly smaller than the thermal conductivity of their bulk material counterpart. Thus, the thermal diffusivities are significantly smaller and modified testing parameters/equipment would be required for studying powder bed and green components produced by processes such as binder jetting. These techniques would also be appropriate for studying other green powder parts produced by traditional metal and ceramic powder techniques and for polymer AM components. The longer pulse would be helpful for defect detection and improved accuracy.

Figure 3:
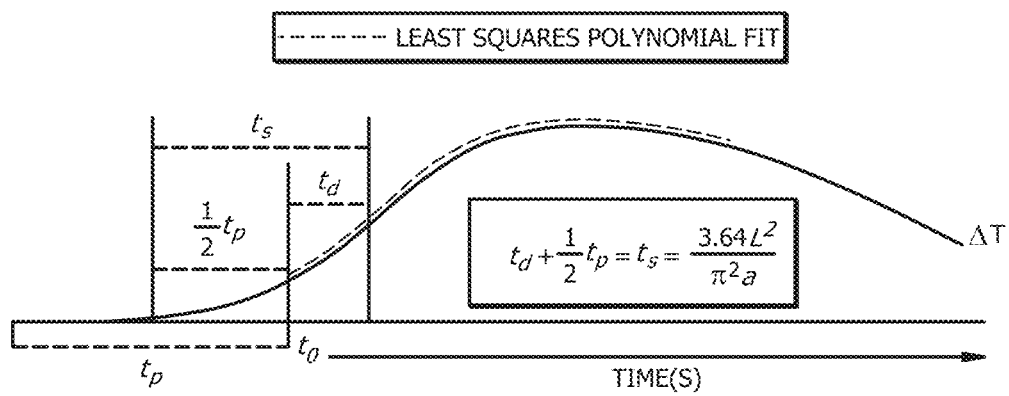
FIG. 3 is a schematic representation of time measurements in defect depth calculation, wherein the peak slope is calculated from a polynomial fit of the data after the end of the pulse, but the peak slope time (ts) used for defect depth calculation includes half the pulse length (tp/2).

FIG. 3 illustrates how equation (2) can be analyzed, with the starting point for the peak slope time determination at half the pulse length. As shown in FIG. 3, the peak temperature contrast time for the defect ($t_d$) is found by fitting a polynomial to the temperature contrast starting at the end of the pulse. The ($t_d$) is added to half of the pulse length to find ($t_s$), which is the actual peak slope time ($t_s$) use for calculation of the defect depth. The updated equation can be seen as:

$$t_d + \frac{1}{2}t_p = t_s = \frac{3.64 L^2}{\pi^2 \alpha} \quad (7)$$

When the pulse length is small, relative to the peak slope time ($t_p \ll t_s$), the original equation for quantifying defect depths via peak slope contrast time is recovered.

Figure 4A:
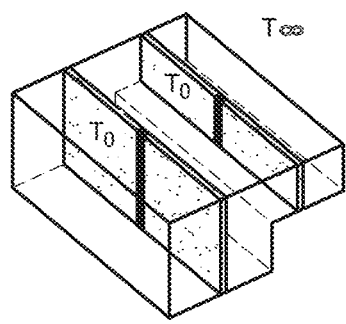
FIG. 4A is a 3D schematic representation of the simulation boundary conditions used for 1D simulation of pulse thermographic method.
Figure 4B:
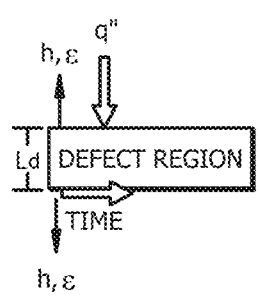
FIG. 4B is a 1D model to represent a defect region of the 3D model in FIG. 4A.
Figure 4C:
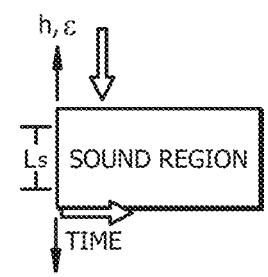
FIG. 4C is a 2D model to represent a defect free region of the 3D model in FIG. 4A.

In an exemplary embodiment, the method of Pulse Thermography (PT) is based on 1D heat conduction into the part from the surface of the part. FIG. 4A illustrates a 3D part of interest. FIG. 4B illustrates a 1D model showing a defect region and FIG. 4C illustrates a 1D model showing a sound region. Simulations based upon FIGS. 4B and 4C were performed to include both during the pulse and for a period of time after the pulse that is sufficient to extract the significant information. The specific time after the pulse varied based upon the thermal properties of the material beings studied. Upon calculation of the internal temperature distribution over time, predicted surface temperature over time was extracted for both the defective region simulation (FIG. 4B) and the sound region simulation (FIG. 4C).

The defective region has a thickness equal to the defect depth ($L_d$ in FIG. 4B) while the sound region is modeled with a thickness greater than twice the thickness of the defect ($L_s$ in FIG. 4C). The sound region needs to be at a minimum of twice the width of the defect depth for equation (2) to accurately calculate defect depth with the constant 3.64. If the depth of the sound region is not more than twice the depth of the defect region being measured, then equation (2) will not accurately calculate the depth and the constant of 3.64 will need to be changed as discussed above.

In this exemplary embodiment, the sides were set as insulated boundary conditions, based on the 1D conduction analysis, and the heat flux was a unit step function. The magnitude of the heat power was held constant while the pulse length was varied, thus varying the energy input. The heat flux applied during each pulse length was set at 4000 W. The emissivity value of 0.9 was chosen to increase the effect of radiative heat loss as well as to better represent practical experimentation cases, as most low emissivity materials are coated with a thin layer of high absorptivity paint for testing purposes.

An assumption that neglects all heat loses is acceptable when the measurements are taken in a short time period to ensure that very little cooling takes place before the features of the defect are observed in the surface temperatures. However, with deeper defects or small thermal diffusivities, the peak times occur much further from the end of the pulse. As the cooling time increases, there is an increased possibility that the thermal losses will affect the measurements. To understand the effect that heat losses have on the defect depth calculation, simulations were run with and without convective and radiated heat losses on both surfaces of the part and with the defect with parameters selected to be representative of testing in an environment with a uniform initial temperature.

The Forward Time Center Space (FTCS) method was used to perform the 1D numerical solution. The FTCS is an approximation method derived from the 1D heat equation:

$$\frac{\partial T}{\partial t} = \alpha \frac{\partial^2 T}{\partial t^2}, 0 < x < L, t \geq 0 \quad (8)$$

where $\alpha$ is the thermal diffusivity of the material and L is the thickness of the part. For a stable solution the value of r is given as:

$$r = \frac{\alpha \Delta t}{\Delta x^2} < \frac{1}{2} \quad (9)$$

must be less than the constant 0.5. For the simulations, the time discretization was varied based on the material being simulated to assure convergence. The simulation was implemented in MATLAB, with the defect depth calculation determined by the peak temperature contrast method. Solutions were verified against a commercial thermal solver, with the same boundary conditions. There were minimal differences between the two methods, which were attributed to different time and spatial discretization between the two approaches. To more accurately represent application of the peak slope time defect depth quantification to experimental data, a normally distributed random noise with a standard deviation of 0.0014K was added to the simulation data. The was observed to have an impact on the minimum energy input required to solve for the defect depth, but if input energy in increased, there is not a significant impact of the noise on the calculated depth values.

In an experimental analysis of the pulse duration, an FLIR SC4000 MWIR infrared camera (3-5 µm sensitivity) was used to analyze the surface temperature with a 50 mm indium antimonide (InSb) lens. The frame rate was set at 100 hz with a focal plane array of 320×256 pixels. For pulse heating of the surface, two 500 W halogen bulbs were set approximately 7" from the surface of the part with an incidence angle of less than 25. Two pieces of acrylic (PMMA) glass was used to filter infrared light to avoid temperature errors from reflections into the IR camera. The noise in the temperature data of the camera was measured at ~0.007° C. when spatially averaging the acquired temperature over an 8×8 mm area.

TABLE I

Material Properties of the Four Materials Used in the Defect Depth Simulation

| Material | Thermal Conductivity, K (Wm$^{-1}$K$^{-1}$) | Specific Heat Capacity, C (Jkg$^{-1}$K$^{-1}$) | Density, $\rho$ | Thermal Diffusivity, $\alpha$ (m$^2$s$^{-1}$) |
|---|---|---|---|---|
| ABS | 0.2256 | 1386 | 1020 | 1.596 × 10$^{-7}$ |
| PLA | 0.13 | 1800 | 1300 | 5.556 × 10$^{-8}$ |
| Copper | 400 | 398 | 8912 | 1.128 × 10$^{-4}$ |
| 316 SS | 16.2 | 500 | 7990 | 4.055 × 10$^{-6}$ |

Table I shows the material properties of the materials used in the simulation. For the experimental evaluation, the thermal diffusivity of Acrylonitrile butadiene styrene (ABS) (1.137e-07 m$^2$ s$^{-1}$) and Polylactic acid (PLA) (1.414e-07 m$^2$ s$^{-1}$) were used. These thermal diffusivity values were previously found experimentally using a long pulse thermography method with pulse lengths of less than 500 ms. Two defect depths were analyzed for both ABS and PLA. For ABS, the defect depths were 0.85 mm and 1.15 mm and the defect widths for each were 8×8 mm. For the PLA analysis, the two defect depths were 0.68 mm and 1.0 mm with a width of 12×12 mm. Each part was flashed with pulse lengths ranging from 0.25 s up to 5.0 s. This range was chosen based on the measured values of thermal diffusivity for each material and their defect depths.

To acquire the peak slope times, a polynomial fit of the temperature contrast was performed to minimize the effect of the noise when taking the derivative as is commonly done in practice. The zero-time point was taken as the midpoint of the pulse. The equation for the polynomial curve was then used to determine the derivative of the temperature contrast curve and the peak slope time was acquired from this derivative to find $t_d$ which is used to calculate $t_s$ using equation (7).

The simulation results showed that heat loss from the surfaces (emissivity, convection) had negligible impact. The heat losses impacted calculated depths in the metals less than 1%. While the lower thermal diffusivity, and thus longer times before the peak slope occurs, increased errors in polymers, the heat losses still only changed ABS and PLA depth calculations by 1-2%. This variation is much less than the possible variation and error from noise and fitting of the temperature data. While the difference was negligible, the simulations with heat loss were used in all the following results.

The simulation error was calculated by comparing the defect depth calculated from the simulation data to the actual defect depth. The error was analyzed as a function of the normalized pulse lengths defined in equation 5 and equation 6. As seen in FIG. 3, the error in the defect depth calculation is well correlated to the normalized pulse length for both analysis methods and for both polymer and metals.

FIG. 3 shows that for any given defect depth, the error in the defect calculation should stay below 5% if $t_p/t_s<1$. Under these conditions, the pulse length does not exceed the actual peak slope contrast time of a defect. For example, ABS with a 0.5 mm sub-surface defect, has a peak slope contrast time ($t_s$) of 577 ms. Thus, the maximum pulse length to accurately calculate this defect within 5% error is approximately equal to 577 ms. The experimental long pulse results show the same trend of increasing error with longer pulse lengths as the simulations. In both cases, the error in the calculated depths trends upwards once the pulse length reaches approximately 70% of the actual peak slope contrast time for the material. Table II illustrates the maximum pulse length to obtain accurate defect detection within 5% error based on the simulation results for several materials and depths.

TABLE II

Predicted Maximum Pulse Lengths for Less than 5% Error for Varying Materials and Defect Depths

| Defect Depth (mm) | ABS Peak Slope | PLA Peak Slope | 316 SS Peak Slope | Copper Peak Slope |
|---|---|---|---|---|
| 0.3 | 0.208 s | 0.597 s | 0.0082 s | 0.0003 s |
| 0.5 | 0.578 s | 1.66 s | 0.023 s | 0.0008 s |
| 1.0 | 2.31 s | 6.63 s | 0.091 s | 0.0033 s |
| 2.0 | 9.24 s | 26.55 s | 0.36 s | 0.013 s |

The experimental results of ABS and PLA confirm the general trend of the percent error for defect depth calculation compared to the simulated calculations as seen in FIG. 3. At approximately 75% of the characteristic peak slope times for each material and for each depth, the percent error in defect depth calculation begins to increase. As the normalized pulse length increases, the error in calculated depth increases but is only 15% at $t_p/t_s=2$.

Figure 5:
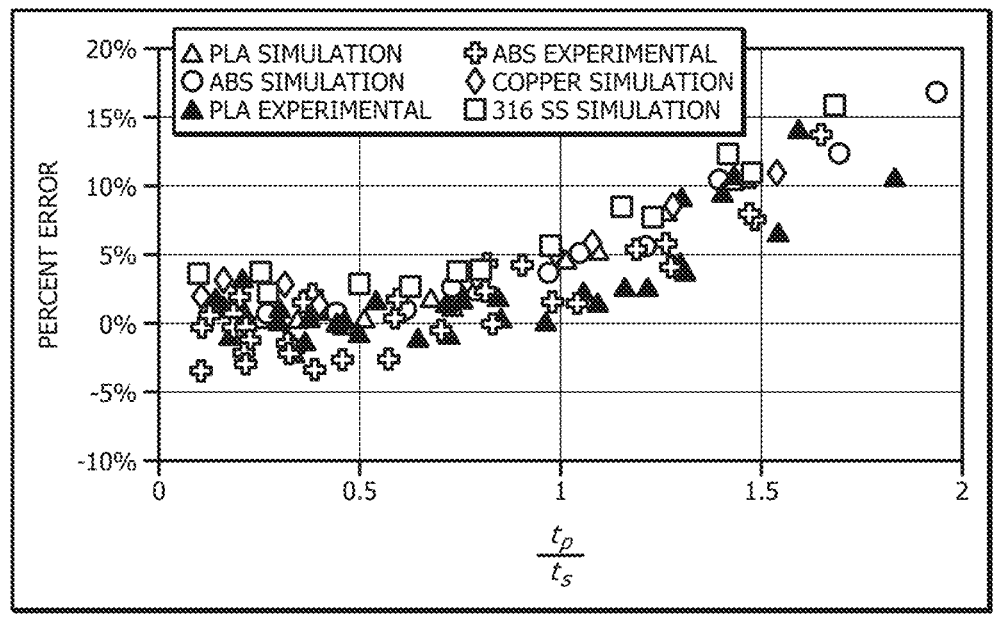
FIG. 5 is a graphical illustration of comparison of defect depth calculations in simulation and experimental results for a range of materials.

Given the consistency of the error variation with pulse length, a correction factor can be applied. In this case, when the normalized pulse length exceeds approximately 0.75, the error increases nearly linearly. Beyond the normalized pulse length of approximately 0.75, the constant of 3.64 in equation (7) will need to be adjusted. The necessary adjustments to the constant can be seen in FIG. 5. Using the $t_d$ from the experimental results of the ABS and PLA, the constants required to exactly calculate the depth were plotted in relation to $t_p/t_s$. A best fit of the data was applied and the best fit line should be used to accurately calculate the defect depth when $t_p$ is greater than approximately 75% of $t_s$. However, since even when $t_p/t_s$ is equal to 1, the experimental results showed accuracy within 5%, the recommendation to re-evaluate the constant in equation (7) can be extended to $t_p/t_s$ ratios larger than 1.

Figure 6:
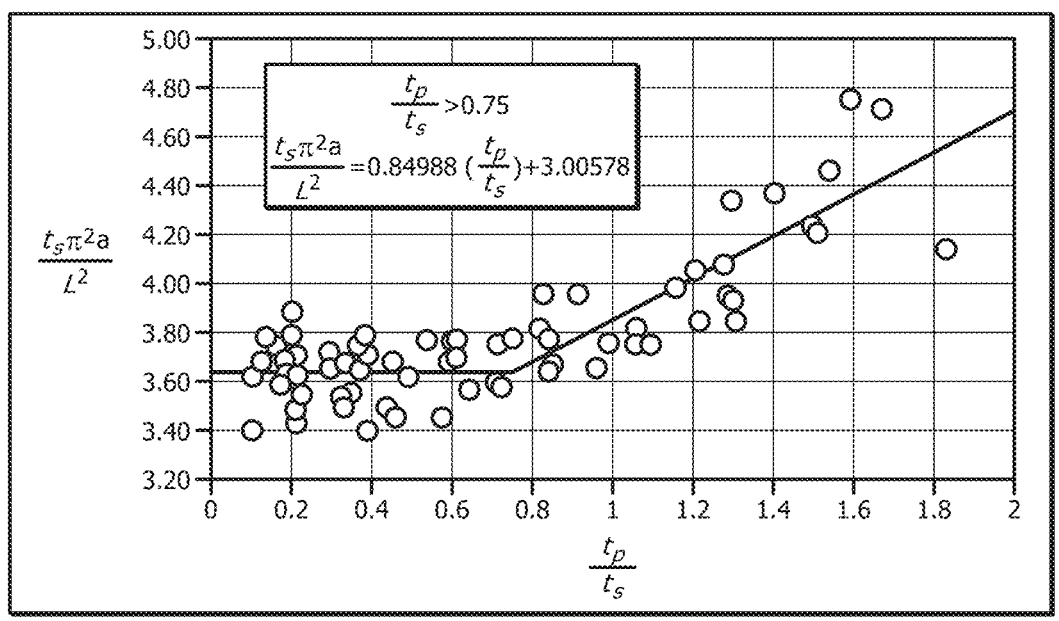
FIG. 6 is a graphical illustration of the experimental evaluations of the constants required to accurately calculate the exact defect depths of the ABS and PLA parts. The black line is the least squares fit of the experimental results.

FIG. 6 shows the experimental and simulation results, with the constant in equation (7) re-evaluated based on the respective normalized pulse length ratios for each trial. It can be seen that, by re-evaluating the constants based on the normalized pulse length greater than 0.75 the calculated defect depths percent error dropped to within approximately 5% of the actual depth across the entire range of experiments and simulation results.

Even after adjusting the constant based on the normalized pulse length, the method fails as $t_p/t_s \rightarrow 2$. The peak slope in the temperature contrast disappears after the normalized pulse length exceeds approximately 2. As the pulse length increases for a constant defect depth, the time the peak slope occurs after the pulse ($t_d$) will decrease to zero at $t_p/t_s=2$. Beyond this point, the continued heating alters the relationship and even before this limit, a short gap between the end of the pulse and the peak slope time complicates identification of the peak. Thus, a normalized pulse length of 2 is the maximum for accurately quantifying defect depths with a longer pulse using standard pulse thermography methods.

In comparing the experimental results to the simulation results, as shown in FIG. 6, it can be seen that, the experimental results' percent error trended lower than the simulation for the same pulse length. Also, with shorter pulse lengths the experimentally calculated depths experienced more variation between ABS and PLA. The variation may be due to effects such as nonuniform input flux or variation in the thermal properties due to small differences in the void content due to changes in the 3D printing processes used to create the parts. Even with 100% infill target, there will be a thermal resistance between each extruded filament and small voids. This could create a slightly lower thermal diffusivity that would offset the results.

The ability to characterize the maximum allowable pulse length for accurate defect detection is a crucial benefit in analyzing a specific part. Based on the expected defect depths, a maximum pulse length can be selected that increases the energy input for higher signal to noise ratios. Comparing PLA versus ABS, two materials most commonly used for FDM printing, the thermal properties are different. As such, at 4 kW power and a 2 ms pulse the thermal contrast at the point of peak slope for ABS is 68% larger than that for PLA, but both are below the expected experimental noise level of the SC4000 camera (0.007° C. when averaged over a small region). Thus, either a longer pulse or more power to produce a larger energy input is required to quantify the defect depth.

The aspect of increasing the power to achieve the necessary signal to noise ratio however, can produce unintended thermal effects on the part being tested. For example, in order to put 400 J of energy into a part in 2 ms, the temperature increase of the surface would be approximately 17° C. This level of temperature increase could introduce more error due to possible phase changes and significantly added radiative heat losses. With a 320 ms pulse, the surface temperature doesn't exceed 2° C. but, the temperature contrast between the defective and sound region is the same. Thus, to achieve the best signal to noise ratio and an increase possibility of accuracy in quantifying defect depth, increasing the pulse length is the better of the two choices.

Acceptable pulse length is a function of the depth of defects being examined and the thermal properties of the material. Both the simulation and the experimental results showed that the maximum pulse length achievable for a given material to be within 5% error is equal to the peak slope time for the specific depth that is being measured. The experimental results trend on the lower side of the calculated error, allowing for pulse lengths up to 1.2 times the peak slope time in this case. Given the consistency of the error across a range of materials, the depth formula could be adjusted when the normalized pulse length exceeds 0.75 to more accurately quantify the defect depth. By utilizing the maximum allowable pulse length for accurate defect detection, the energy input can be significantly increased creating larger thermal contrasts on the surface. This in turn minimizes the possible error from the signal to noise ratio and also allows for defect depth measurements of a much wider range of defect depths as well as a much wider range of materials.

3D additive parts are commonly formed from one or more thermoplastic materials. The PT method previously described has been used to detect defects in materials such as steels, ceramics and composites. However, these materials have higher thermal diffusivities ($\alpha$) than a thermoplastic, which accounts for shorter time periods before the defect temperature gradient appears on the surface of the part, as evidenced by equation (2). The higher thermal diffusivity materials require a shorter pulse to simulate a Dirac heating pulse that is sufficient to identify the peak contrast derivative time at the surface.

Due to the low thermal diffusivity of thermoplastics, such as Acrylonitrile butadiene styrene (ABS), the time difference between when the temperature profile reaches the defect and begins 3D conduction is much longer than with higher thermal diffusivity materials. More specifically, the time difference is proportional to the difference in thermal diffusivity. For example, ABS has an approximate thermal diffusivity that is ½₅th that of 316 stainless steel (SS). Therefore, it takes 25 times longer for a temperature gradient from a defect to be seen at the surface in a part manufactured with ABS, in comparison to a stainless-steel part. The time difference before the temperature profile reaches a defect and begins 3D conduction that is attributed to the ABS material, allows for a longer pulse rate, thus eliminating the need for flash lamps.

Commonly in PT, two flash lamps of 2000 watts (W) are flashed for a range between 2-10 ms to produce a range of 8-40 joules (J) of energy that is projected onto the surface of the part being thermally excited. By simply increasing the flash duration form 2 to 10 ms (5×), the energy input increases as well 5×. To be able to increase the amount of the energy even more would require a larger capacitor to store more energy.

However, in the present invention, by using a steady continuous voltage supply for longer pulses, the same energy input of 32 J can be produced with two 500 W halogen bulbs flashed for 40 ms. And halogen bulbs can be flashed for a much longer duration, increasing the energy even more.

Figure 7A:
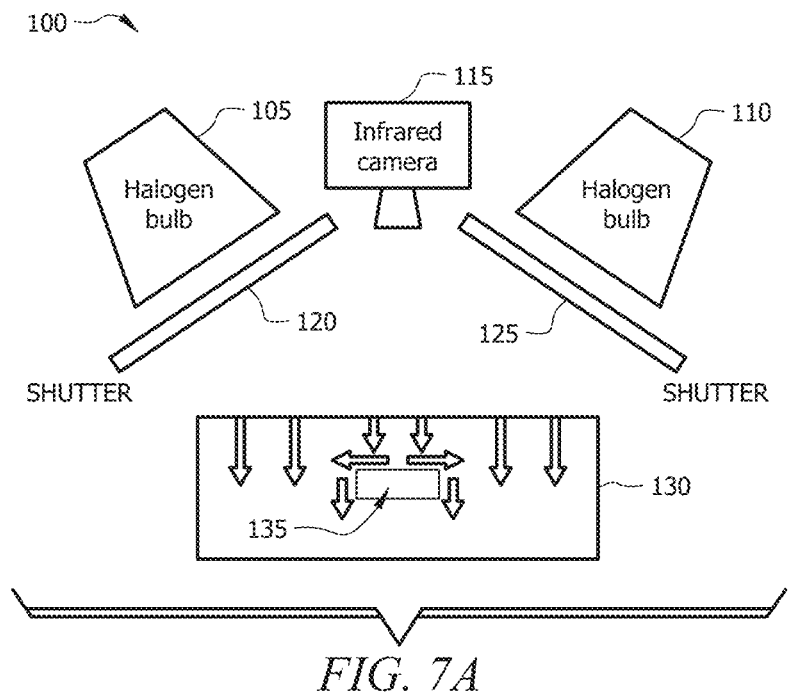
FIG. 7A is a schematic diagram of the experimental setup for pulse thermography testing, in accordance with an embodiment of the present invention.

In an exemplary embodiment of the PT detection system of the present invention 100, instead of flash lamps as required for a 2-10 ms pulse, two 500 W halogen bulbs 105, 110 rated for 120V, 56 degrees from incidence of the surface of the part 130, were flashed for 300 ms at 120 V. After the pulse of heat is completed, two shutters 120, 125 are rotated into place, thereby blocking the halogen bulbs 105, 110 from the part 130, as shown in FIG. 7A. Even after the pulse is completed, the halogen bulbs 105, 110 emit radiant heat while they are cooling down. This radiant heat not only continues to input energy into the part 130 but also reflects off the surface of the part. This reflection introduces error into the infrared temperature measurements made by the infrared camera 115. In this exemplary embodiment, the infrared camera 115 used for the experiments is an FLIR SC4000 MWIR reading infrared in the midwave spectrum 3-5 μm with a 50 mm indium antimonide (InSb) lens. The frame rate was set at 60 hz with a focal plane array of 320×256 pixels.

Following the completion of the pulse, the shutters 120, 125 were engaged to block the radiant heat and the surface temperature of the part 130 was monitored by the IR camera 115 for a total time of 15 seconds. In this exemplary embodiment, a sample ABS part was printed using FDM with intentional defects introduced. The defects used in these calculations were 8 mm×8 mm. The average temperature taken over the surface area of the defect was used for calculation of the depths of the defects. For the reference sound area, an average temperature was taken in the closest sound region to each defect depth with the same overall surface area as the defect. A reference sound area was taken for each defect to minimize any error from spatial variation in heating intensity across the surface.

Figure 7B:
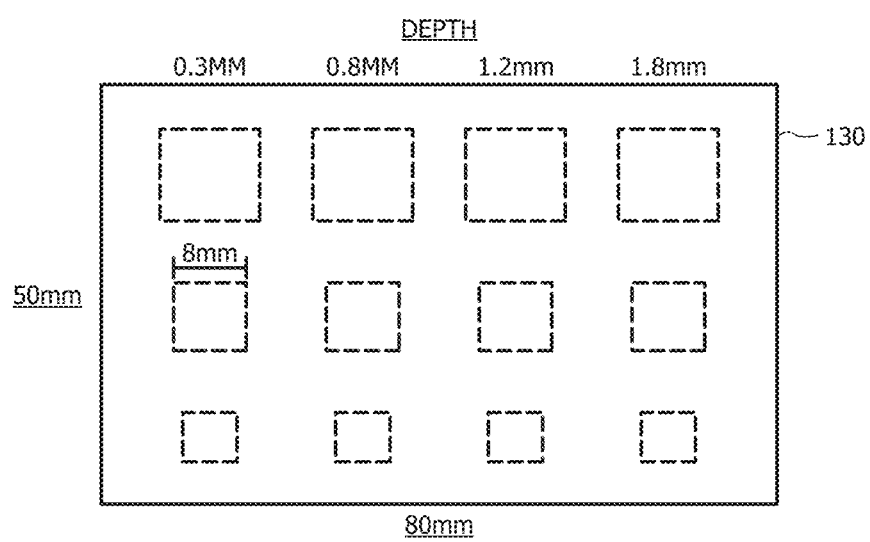
FIG. 7B is a diagram of the ABS printed part used for testing defect depth calculations, in accordance with an embodiment of the present invention.

Acrylonitrile butadiene styrene (ABS), one of the more common FDM printed thermoplastic materials, was used for defect depth prediction in this exemplary embodiment. A 50×80×8 mm rectangular part was printed with four different defect depths, with three difference widths, for each depth. The schematic of the printed part is shown in FIG. 7B. To minimize reflectivity and increase absorptivity, the part was printed with black ABS. The defect depths were approximately 0.3 mm, 0.8 mm, 1.2 mm, and 1.8 mm. The layer patterning was set to standard and an infill pattern of 100% was used. Due to the variations in thermal properties that can arise from the printing process, additives in the ABS material, and the AM process itself, the thermal diffusivity used was based on the best fit of calculated depths. Each measurement was repeated multiple times to assess the repeatability of the method.

From equation (2), the peak slope time is directly proportional to the square of the defect depth. As the pulse length increases, the instantaneous heat input assumption will break down and ultimately change the calculated depth. To understand how this would affect the calculations, a Solidworks® thermal simulation of a 0.5 mm deep defect was analyzed with the boundary conditions shown in FIG. 8A. Due to the longer peak slope times with a low thermal diffusivity material like ABS, heat losses consisting of radiation and convection will be included in the simulation. Three different starting points were used for the peak slope time calculation of the defect depth. The first value was the total time with to starting at the end of the pulse, the second value was the time with to starting at the beginning of the pulse, and the third value for depth calculation was the time with to starting in the middle of the pulse.

Figures 8A, 8B:
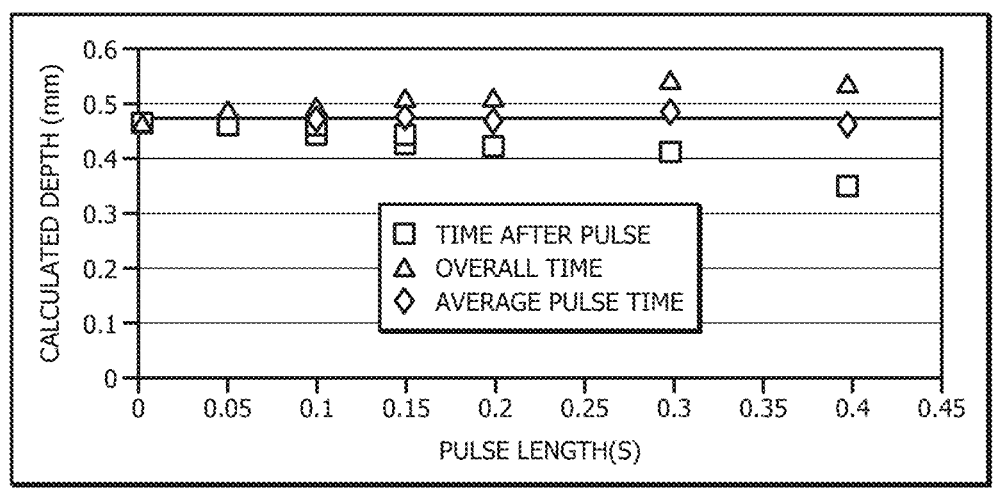
FIG. 8A is a table of the boundary conditions for simulation of ABS, in accordance with an embodiment of the present invention.
FIG. 8B is an illustration of the calculated depths for a 0.5 mm defect depth using the three peak slope time values with different starting times (to), in accordance with an embodiment of the present invention.

FIG. 8B shows the calculated depths from each of the peak slope time values. At short pulse times, all give the same results. However, when starting to at the end of the pulse, the calculated depths decrease with increasing pulse length and when starting to at the beginning of the pulse the calculated depths linearly increase with increased pulse length. When using the peak slope time value with to starting at half the pulse length, the calculated depths become independent of pulse length over the range studied. Extending the pulse length allowed for more energy input which increases the temperature contrast to detect deeper defects.

Figure 9:
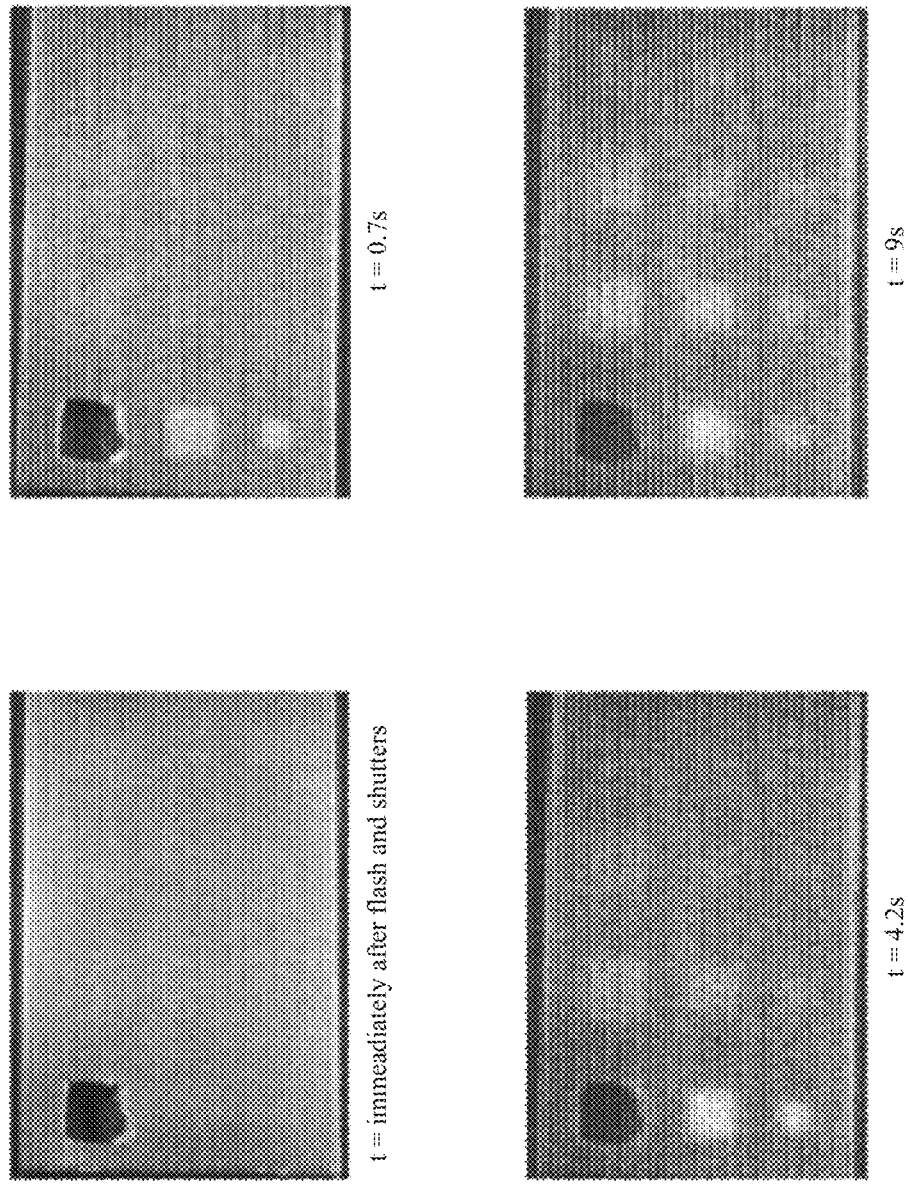
FIG. 9 is an illustration of thermal images over time of FDM printed ABS part, in accordance with an embodiment of the present invention. NOTE: The cool spot in the top left corner is a cutout that was made for depth analysis and not considered a defect for analysis purposes.
Figure 10A:
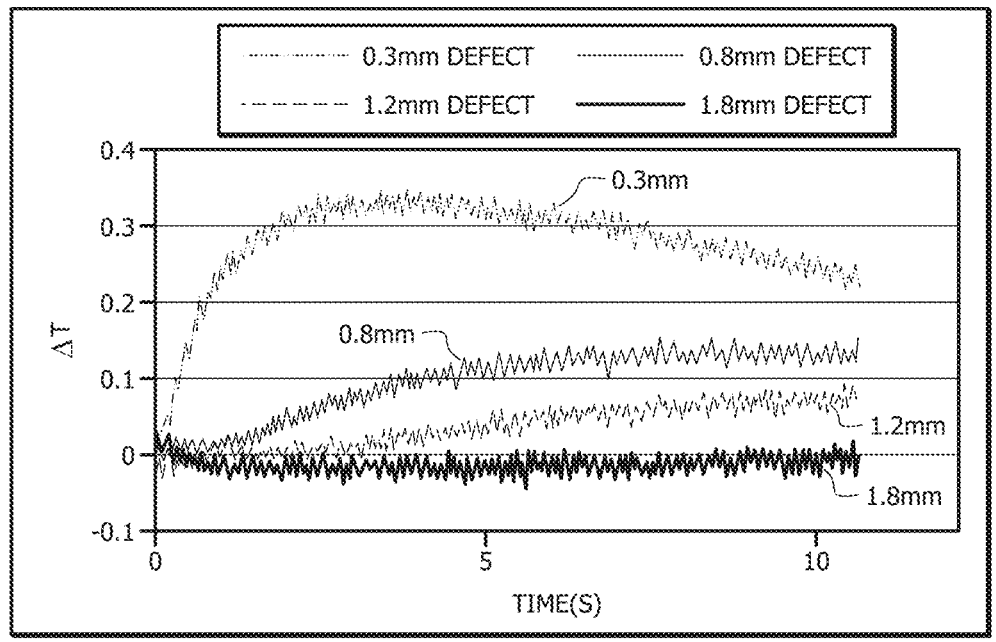
FIG. 10A is an illustration of a temperature contrast plotted over time for each defect depth, in accordance with an embodiment of the present invention.

FIG. 9 illustrates the surface temperature, over time, with the 300 ms pulse. After nine seconds of surface monitoring the three defect depths of 0.3, 0.8, and 1.2 mm are visible in the thermal image. The 1.8 mm defect is not visible in the thermal image at any time step, nor in the temperature contrast data, as seen in FIG. 10A. Beyond 1.2 mm depth, any temperature difference between sound and defect regions are within the measurement noise. Presumably, more energy input is required for measurement of the depth of 1.8 mm. Therefore, for the 1.8 mm defect depth, pulse lengths of 1.5 s, 4 s, and 6 s were used for quantification of defect depth.

Figure 10B:
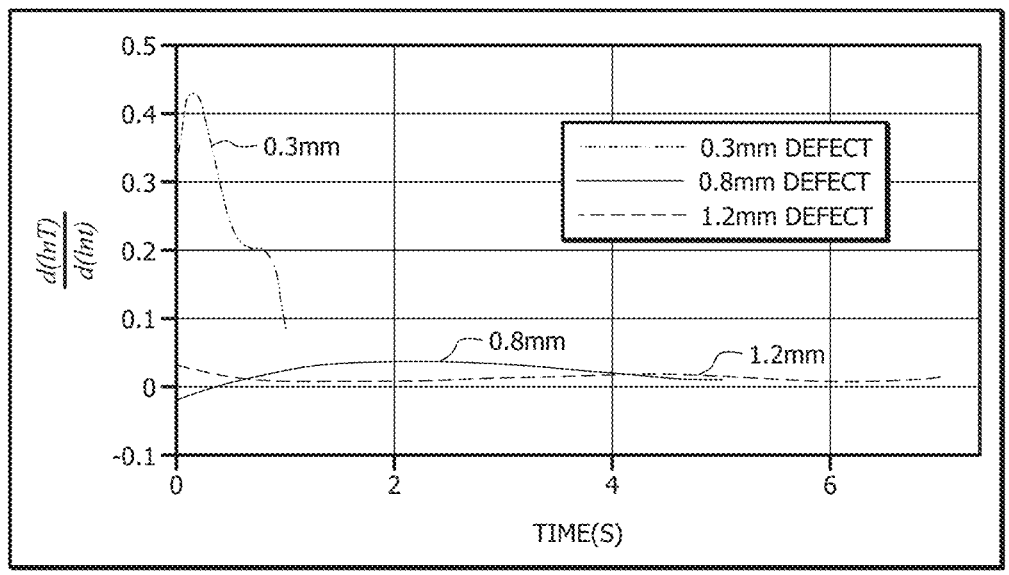
FIG. 10B is an illustration of the first derivative of the polynomial fit of the temperature contrast data for peak slope time calculations, in accordance with an embodiment of the present invention.
Figure 11A:
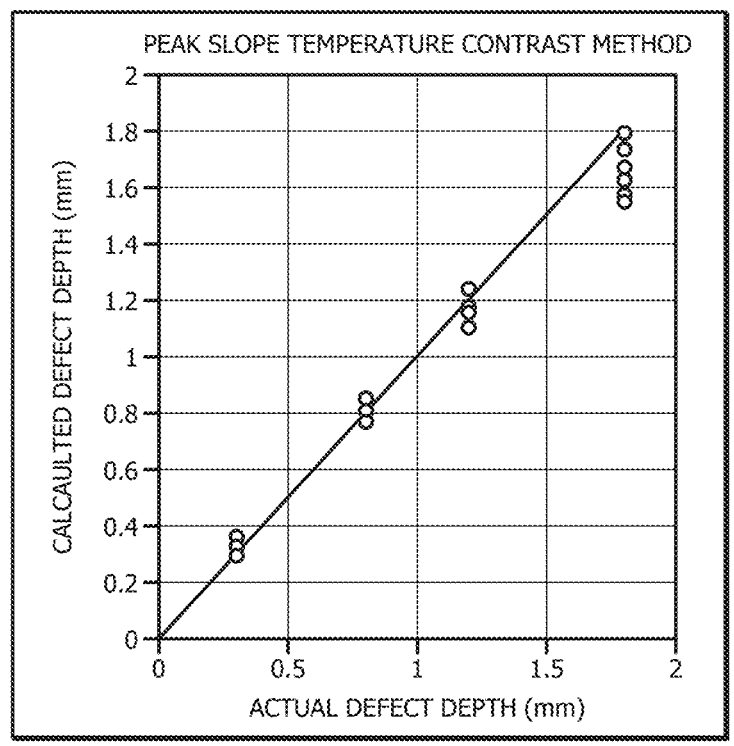
FIG. 11A is an illustration of the results for calculated defect depths using the peak temperature contrast derivative method, in accordance with an embodiment of the present invention.

In order to reduce noise, a small rectangular region of pixels was averaged at each time point for the sound and defect region. The defect depths were calculated by taking a polynomial fit of the temperature contrast data, and then the first derivative of that, as seen in FIG. 10B, was taken to find the peak slope times $t_s$. Based on the simulation results, t=0 is taken as the midpoint of the pulse and it can be seen in FIG. 11A that the theory is confirmed and that even with a longer pulse, the defect depths can be calculated using the peak temperature contrast slope method.

As the defects get deeper, the variation of the calculated depth gets larger, when using the peak temperature contrast slope method. That is as expected however, because the deeper defects create a much smaller temperature gradient as energy is dissipated over time. With these smaller temperature gradients, it becomes harder to differentiate from noise in the temperature measurement and the effects of substrate defects. Also, the deeper the defect, the larger cross-sectional area required for accurate depth calculation. The 8×8 mm width of the 1.8 mm defect is not large enough for accurate prediction within ABS, which has a low thermal diffusivity.

Beyond 1.2 mm, the calculated depths were consistently shallower than the actual depth. This may be due to the approximations in the quadratic time/depth relationship. However, with AM, this is not the area of greatest interest for subsurface defect detection. For online process monitoring, defect depth quantification would be focused for only a few layers, to allow for the possibility of repair or scrap before build completion. Deeper defects would be more of a qualitative analysis to determine if a defect, such as delamination, is present in the part.

Figure 11B:
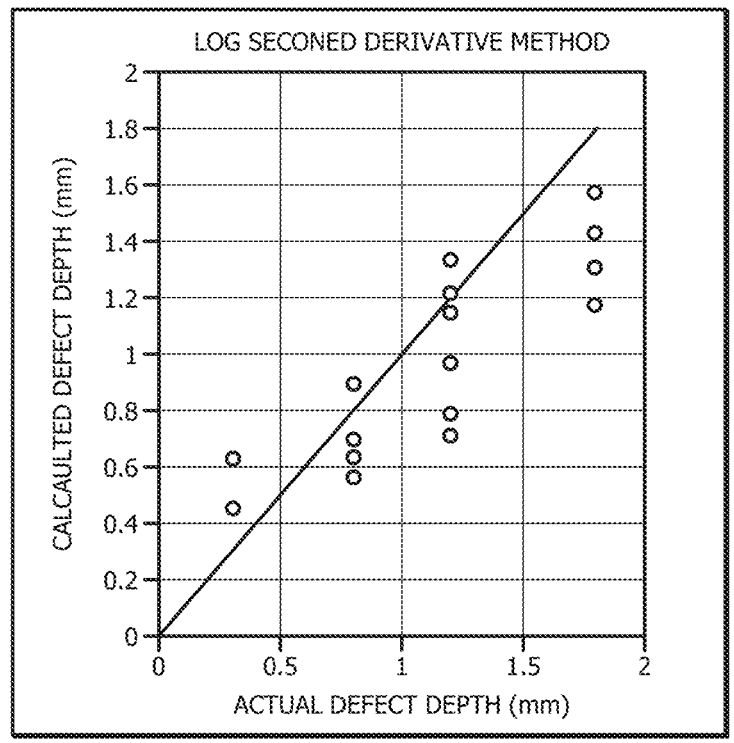
FIG. 11B is an illustration of the results using the log second derivative method, in accordance with an embodiment of the present invention.

Using the log second derivative method, it can be seen in FIG. 11B, that with this experimental setup, the depth calculations have a much larger variation. This could be attributed to the internal temperature distribution from the longer pulse or compounding noise from taking the second derivative of the small temperature rise. Thus, for low thermal diffusivity materials, like ABS, and the tested pulse conditions, the peak temperature contrast method gives better results. As such, based on these studies different pulse conditions, reduced measurement noise, or improved post-processing is necessary for effective defect depth calculation using the log second derivative method.

In the above described embodiment, the system and method of the present invention are effective in detecting and quantifying subsurface defects after the part is built or after a plurality of layers have been laid. By using a longer pulse, accurate defect detection becomes possible with various pulse lengths. Thus, allowing for the capability of increasing the pulse length to increase the energy input into the part. By utilizing the maximum allowable pulse length for accurate defect detection, the energy input can be significantly increased creating larger thermal contrasts on the surface. This in turn minimizes the possible error from the signal to noise ratio. It also allows for defect depth measurements of a much wider range of defect depths as well as a much wider range of parts with various thermal properties.

However, the pulse length cannot exceed approximately 80% of the actual peak slope contrast time for that defect to stay within 5% error for defect depth calculation. For example, ABS with a 0.5 mm subsurface defect, has a peak slope contrast time of 577 ms. Thus, the maximum pulse length to accurately calculate this defect within 5% error is approximately 462 ms. Because of the varying thermal properties of different materials, this maximum pulse length will vary as well. Table III shows for a given set of defect depths the maximum pulse length to obtain accurate defect detection within 5% error.

TABLE III

Predicted maximum pulse lengths varying materials and defect depths

| Defect Depth (mm) | ABS | | 316 L grade SS | | PLA | | Copper | |
| --- | --- | --- | --- | --- | --- | --- | --- | --- |
| | Log Method | Peak Slope | Log Method | Peak Slope | Log Method | Peak Slope | Log Method | Peak Slope |
| 0.3 | 0.144 s | 0.166 s | 0.0057 s | 0.0065 s | 0.413 s | 0.478 s | 0.0002 s | 0.0002 s |
| 0.5 | 0.399 s | 0.462 s | 0.0157 s | 0.0182 s | 1.15 s | 1.33 s | 0.0006 s | 0.0007 s |
| 1.0 | 1.6 s | 1.85 s | 0.0628 s | 0.0728 s | 4.58 s | 5.31 s | 0.0023 s | 0.0026 s |
| 2.0 | 6.38 s | 7.40 s | 0.251 s | 0.291 s | 18.33 s | 21.24 s | 0.009 s | 0.0105 s |

The standard pulse length for PT is 2-10 ms, for copper this would mean the shallowest defect that could be quantified would be 1 mm. Yet for PLA, even at 0.3 mm the max peak using the log second derivative method is 412 ms.

The ability to characterize the maximum allowable pulse length for accurate defect detection is a crucial benefit in analyzing a specific part. For the FDM process for example, the two most common materials used are PLA and ABS. Yet for defect detection, if the current experimental setup is set to pulse the maximum pulse lengths for ABS, the temperature contrast might not be sufficient to differentiate from the noise if the material was switched to PLA. Thus, the pulse times would need to be modified. Modifying the pulse length based on the material being tested is very beneficial for signal to noise ratio.

Even with the capability to detect subsurface defects within a few layers, material and machine time are wasted because the defective area has already been printed over with new layers. Therefore, the most effective form of defect detection would be on the surface, by monitoring each layer as it is laid. This would allow for immediate repair if a defect is detected. For this level of process monitoring, the present invention proposes the use of reflected light in the infrared spectrum to characterize the surface and detect some types of defects before an additional layer is printed.

As such, in an additional embodiment, the present invention provides a system and method effective in monitoring the surface of a part while it is being printed, thereby allowing for possible repair during the manufacturing process, if necessary.

As previously discussed, quantitative analysis of subsurface defect depth focuses on the decay of surface temperature after the end of the pulse. The effectiveness of subsurface defect detection via pulse thermography depends on the size of the defect and the depth. As shown from the results, depths were accurately calculated up to 1.2 mm with an 8×8 mm width defect. When it comes to mechanical properties however, defects much smaller than this can cause mechanical failure in the part. It is known that during tensile testing, some ABS parts fail prematurely because of small imperfections/defects including microcracks in the surface. Thus, the ability to detect fine defects is critical for part performance.

Distinguishing surface defects with an IR camera requires the defects to be heated differently than the surrounding (defect free) areas of the part. The surface roughness of 3D printed parts however, is very small compared to the distance of the heat source. Therefore, even large surface defects have uniform temperature within the surrounding area. However, when using a modified PT method, with illumination in the infrared, wavelengths measured by the camera and monitoring the temperature during the illumination period, it has been found that while the bulb is heating the part, the radiant heat can reflect off the surface features into the IR camera to create an immediate hotspot on the surface. The highlighted defects are dependent on the relative orientation of the source, defect edges, and camera.

Figure 12A:
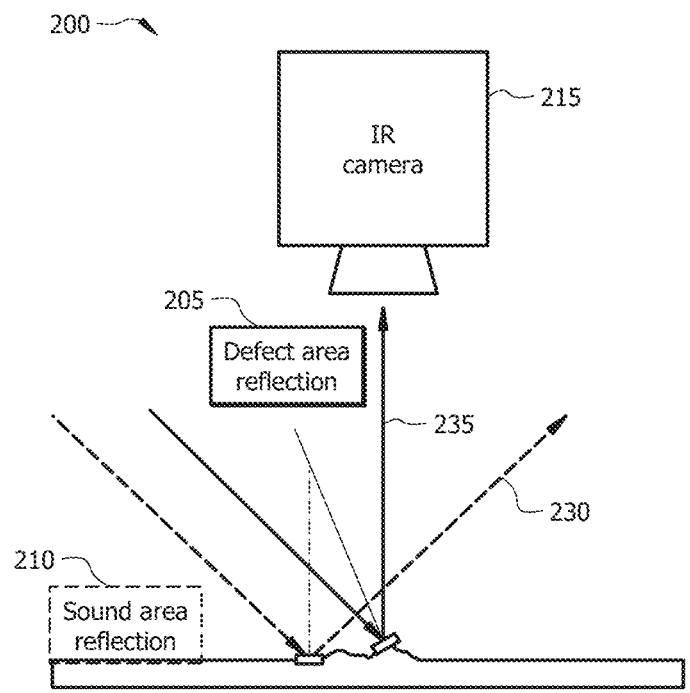
FIG. 12A is an illustration of specular reflections off a sound area compared to specular reflections from a surface defect showing why surface defect reflections show up as hotspots in the IR image, in accordance with an embodiment of the present invention.

There are two types of reflections that can occur from the surface of the part resulting from the radiant heat, including specular reflection and diffuse reflections. Specular reflections occur when the angle of the incoming radiant heat source reflects off the face of the part at the same angle of incidence and follows Fresnel equations. FIG. 12A illustrates the specular reflections 230 off a sound (defect free) area 210, compared to specular reflections 235 from a surface defect 205, showing why surface defect reflections 235 show up as hotspots in the IR camera 215 image.

Figure 12B:
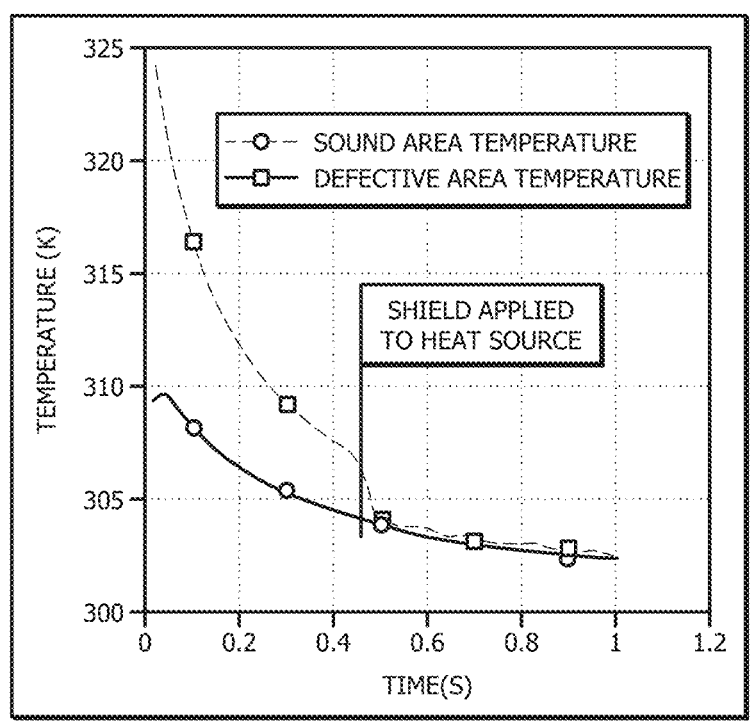
FIG. 12B is an illustration of the comparison between the surface temperature of sound areas to that of a defective area during and after pulse heating of the ABS part, in accordance with an embodiment of the present invention.

Diffuse reflections occur not along the same angle of incidence but in a spherical angular distribution from the plane of interference following Lambert's cosine law. Because no surface is perfectly smooth there will always be diffuse reflections occurring from the surface of a part. The diffuse reflections have a lower intensity than the specular reflections and can be ignored for the analysis of surface defect reflections seen in the IR image. The significance of the diffuse reflection intensity compared to the radiant emission of the product is minimal. This can be seen in FIG. 12B as temperatures in the sound (defect-free) areas produce only diffuse reflections in the IR image and show no significant drop in temperature, once the radiant heat source is shielded from the part. In comparison, defective areas produce specular reflections into the IR image, thereby illustrating a significant temperature difference until a shutter is placed in front of the heat source to block all radiant heat, following the application of the pulse.

Figure 13A:
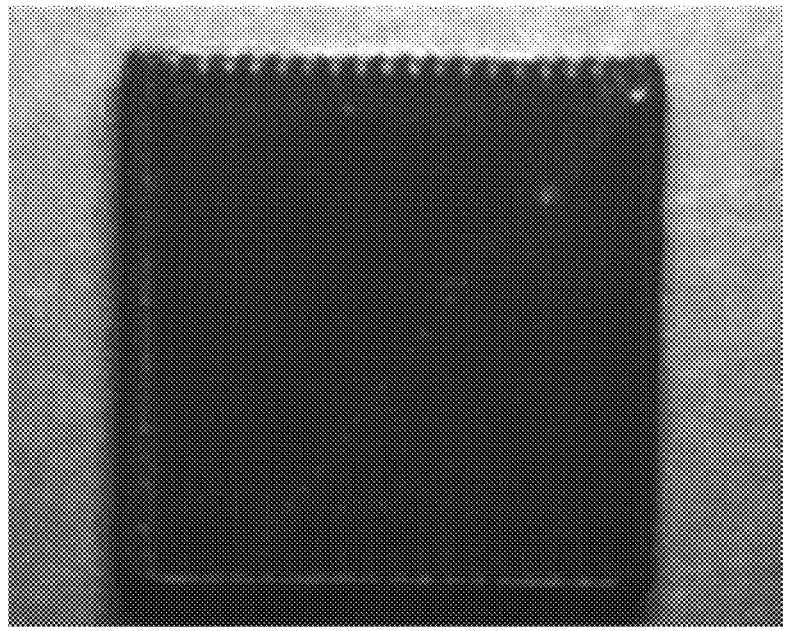
FIG. 13A is a comparison of an ABS part after being pulse heated, wherein the image shows the surface reflections and emission of the part during the pulse and image, in accordance with an embodiment of the present invention.
Figure 13B:
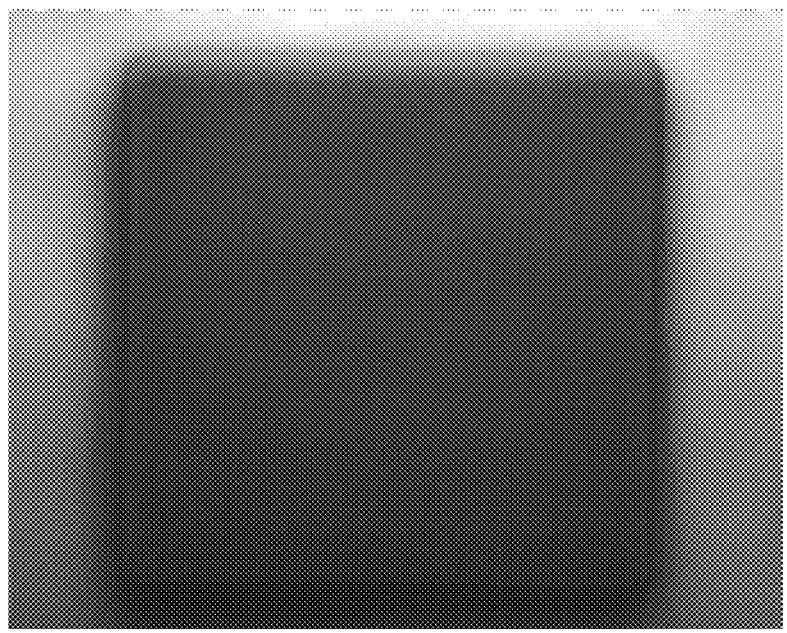
FIG. 13B is a comparison of an ABS part after being pulse heated, wherein the image shows the surface temperature emission after the pulse has completed heating the part and the source shutter is closed to eliminate reflected IR light, in accordance with an embodiment of the present invention.

Immediately following the blocking of the radiant heat source, the defective area temperature drops down to the surrounding sound areas. In an exemplary embodiment, FIG. 13A shows the IR image of the ABS 25×25×8 mm part during pulse heating of the part. In this embodiment, the 3D printed part was pulse heated for 400 ms and after the completion of the pulse, shutters were placed in front of the heat source to block any radiant heat emitting from the bulbs during cooling. The area of the appearing hotspots is not physically hotter after the 400 ms pulse than the surrounding area as shown in FIG. 13B, but because it has a different surface profile than the surrounding area it allows for a specular reflection of the radiant heat to be directed into the IR camera. Therefore, they are reflective spots, and by using the PT method with a longer pulse, a picture of the surface profile can be visually analyzed.

Figure 14A:
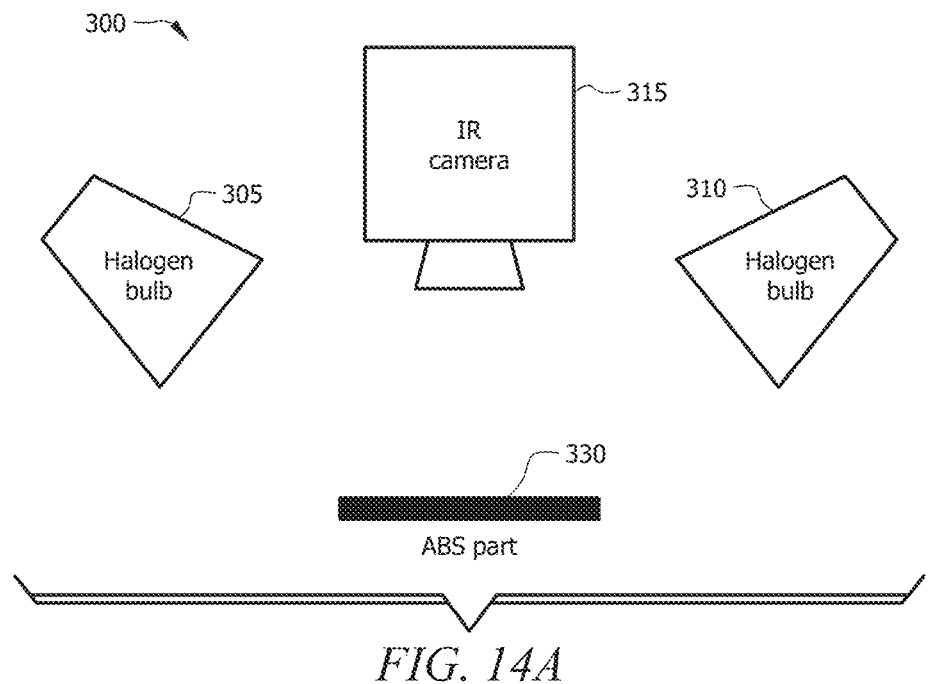
FIG. 14A is an illustration of the setup for the analysis of the surface reflections from the PT method, in accordance with an embodiment of the present invention.
Figure 14B:
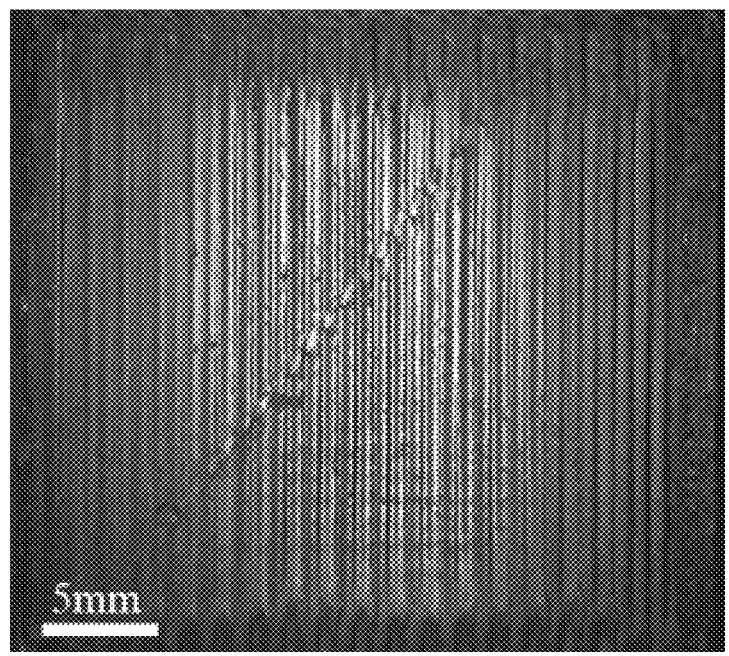
FIG. 14B illustrates an ABS printed Makerfarm part being analyzed for surface defects, in accordance with an embodiment of the present invention.

In an exemplary embodiment for detecting surface defects of an ABS 3D printed parts, the detection system 300 is illustrated in FIG. 14A, which includes two 110V 500-watt Halogen lamps 305, 310. The part 330 being analyzed was a 25 mm by 25 mm and 8 mm thick square made of thermoplastic, ABS, and printed on a MakerFarm 8" Prusa I3v printer. The nozzle diameter was 0.4 mm and a layer height of 0.2 mm was selected. The part was rotated 90° so that the heat source was perpendicular and parallel to the filament. The camera 315 was set at an angle of 90° from the surface to minimize any specular reflections from a sound area and the bulbs 305, 310 were set at 45° from the surface of the part 330. The halogen bulbs 305, 310 were pulsed for 400 milliseconds and then shut off to allow time for analysis of the surface reflections. After completion of the pulse heating, shutters (not shown) were rotated in front of the halogen bulbs 305, 310 to block all radiant heat emitted by the bulbs during cooling, thereby eliminating the reflections seen during the pulse.

Figure 15A:
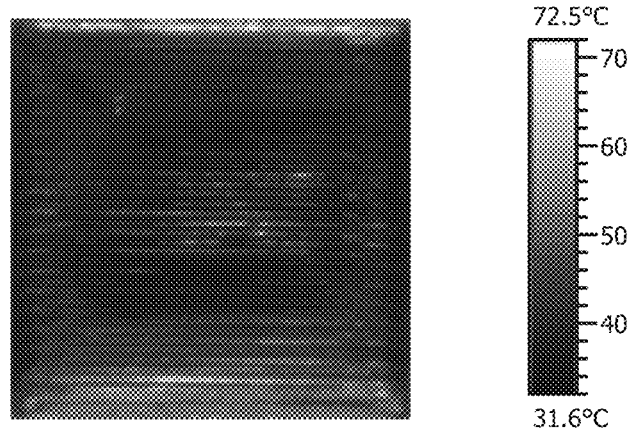
FIG. 15A is an IR image of a 3D printed part at zero degrees starting point roads perpendicular to the heat source, in accordance with an embodiment of the present invention.
Figure 15B:
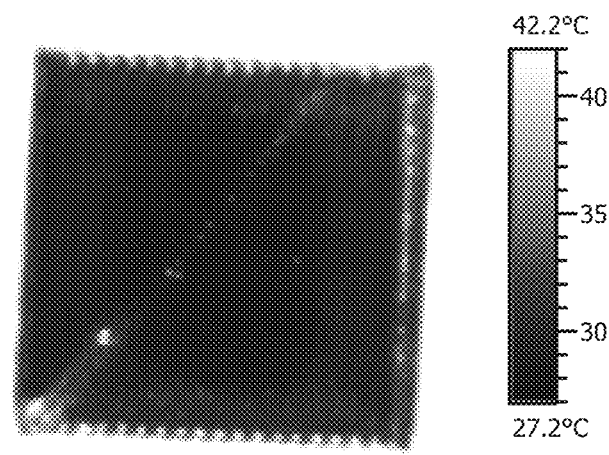
FIG. 15B is an IR image of the part at 90 degrees, roads are parallel with heat source, in accordance with an embodiment of the present invention.
Figure 15C:
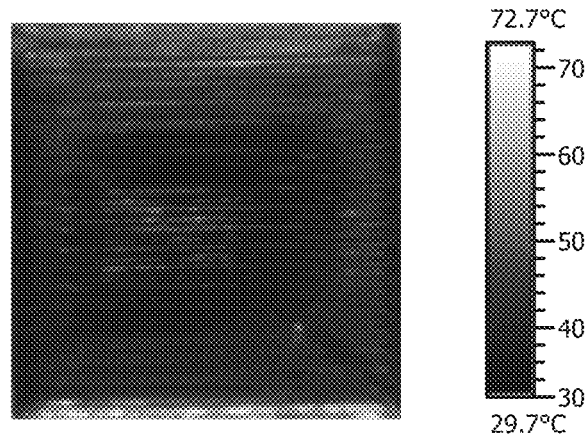
FIG. 15C is an IR image of the part at 180 degrees rotation with roads perpendicular in opposite direction as starting point, in accordance with an embodiment of the present invention.

With a specular reflection, the reflected angle always equals the incident angle. Because of this, the IR camera 315 cannot be setup at the same angle as the heat source to the part 330. That way the IR camera does not pick up the specular reflections from flat planar surfaces. For the camera 315 to pick up a specular reflection of radiant heat, the surface face must create a plane of incidence between the heat source and the IR camera 315 that allows the reflected heat to be seen. This includes defects and road edges, as well as the faces of the roads. FIG. 15A illustrates the IR image of the 3D printed part at 0° starting point with roads perpendicular to the heat source. FIG. 15B illustrates the IR image of the part at 90°, wherein the roads are parallel with the heat source. FIG. 15C illustrates the IR image of the part at 180° rotation, with the roads perpendicular, and in opposite direction as the starting point. FIG. 15A-FIG. 15C show the effect of rotating the part 180°, thereby allowing the heat source to reflect off the surface and the roads at different angles. When the source of the heat is perpendicular to the road direction, the radiant heat reflects off the curved faces of each road. This creates more reflective lines on the surface, masking smaller defects. It does, however, give an approximate representation of the road profiles and the relation to adjacent roads. Depending on the surface profile of a road, it will reflect differently into the IR camera. If the road has a more curved profile, it increases the possibility of creating an angle of incidence into the IR camera.

Figure 16:
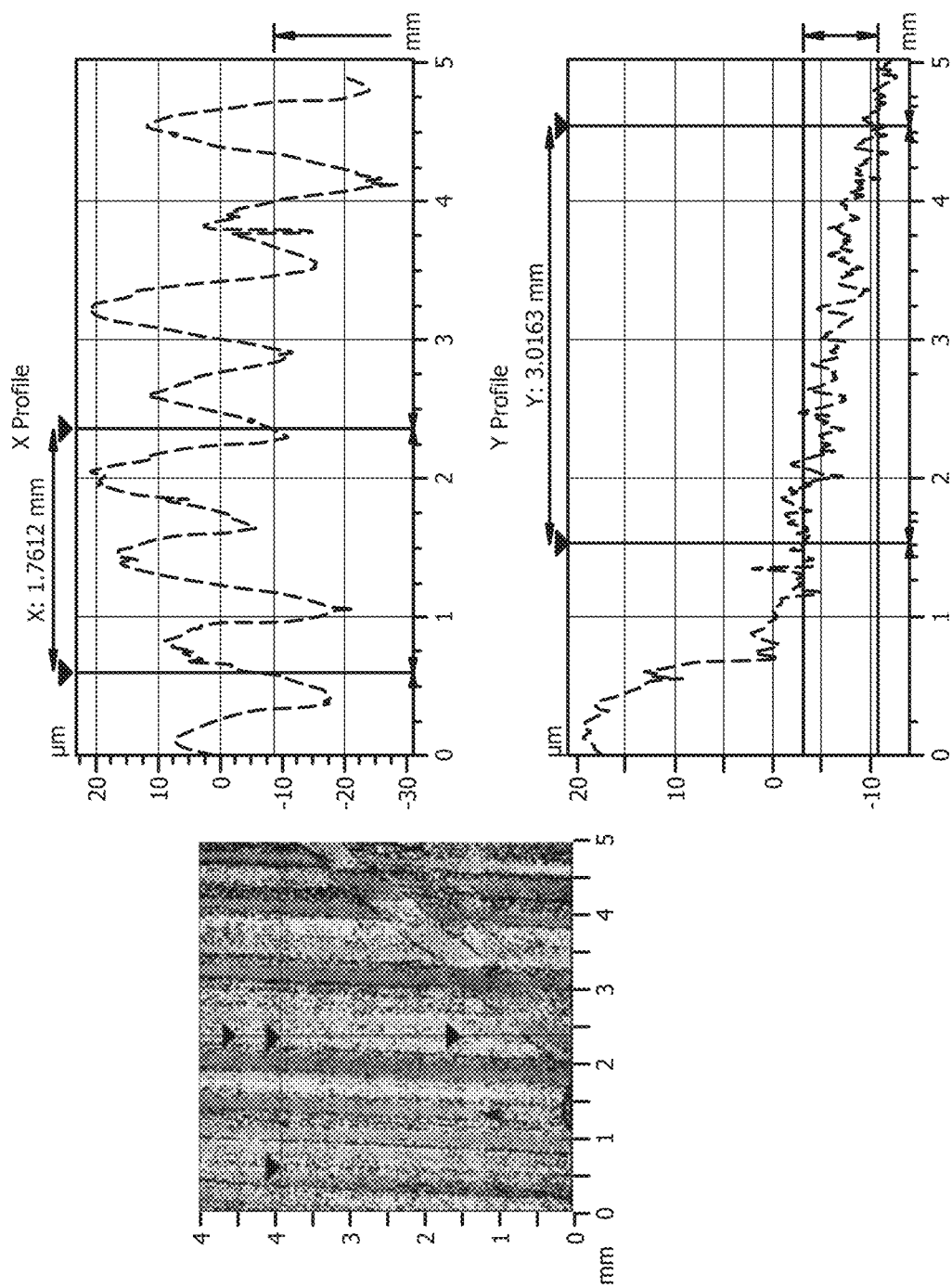
FIG. 16 illustrates optical profilometry data of a portion of the surface of the 3D printed part comparing surface roughness parallel with the roads and perpendicular with the roads, in accordance with an embodiment of the present invention.

FIG. 16 shows optical profilometry data comparing the surface roughness (in microns) between traveling perpendicular to the road direction vs. parallel to the road direction. The road heights vary by approximately 20 microns and have a curved profile, correlating with the reflective lines that appear in the IR image when the heat source is perpendicular to the roads. When the heat source is parallel to the filament direction, most of the road reflections will not be seen by the IR camera unless there is a defect or if a portion of the surface of the part is not flat. The profilometry correlates to this theory as the roughness along the roads is less than 5 microns, with no significantly curved profile, thus producing only diffuse reflections into the IR camera.

Figure 17:
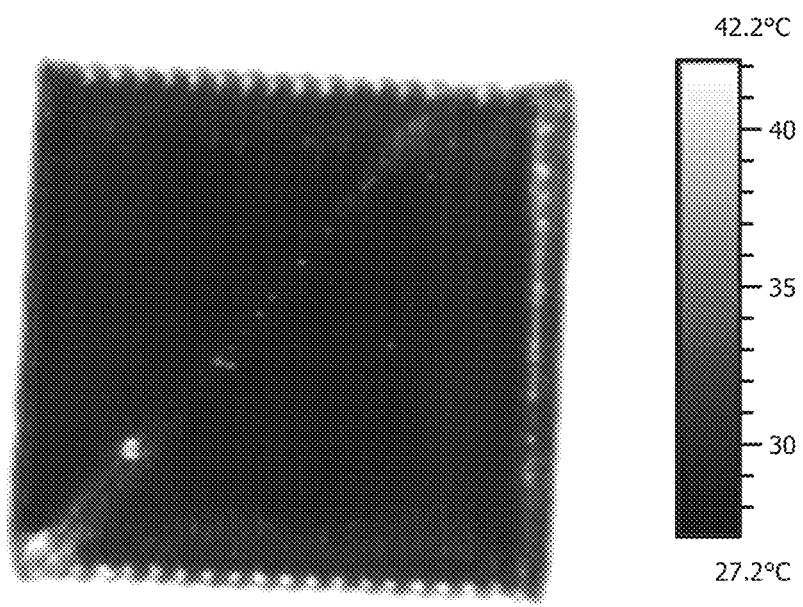
FIG. 17 illustrates the thermal image with reflections during the initial pulse of the ABS part, in accordance with an embodiment of the present invention.

Thermal images were analyzed during the flash as seen in FIG. 17, with the road direction parallel to the heat source. There are many surface reflections that appear on the surface during the pulse. Most of surface reflections follow a diagonal line from the bottom corner of the part going up to the top right of the part. This diagonal line appears to be from the extruder tip being too close to the surface of the part when it changes position from that spot, thereby pushing the edges of the filament and creating a line of ABS. There are also a few small reflective spots scattered throughout the surface of the part. The biggest reflection is in the lower left portion of the part, near the diagonal line.

Figure 18A:
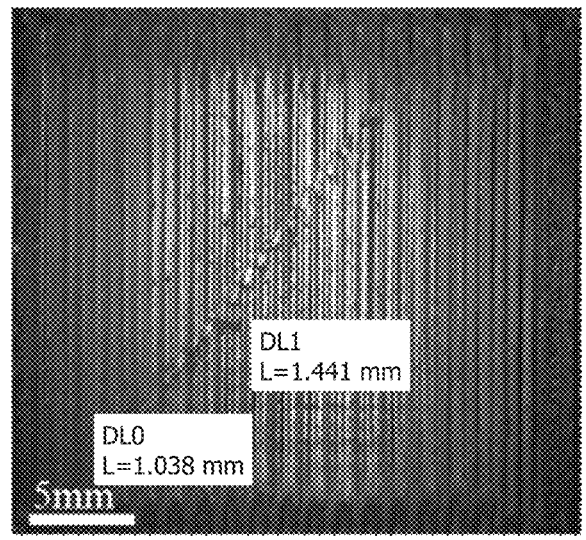
FIG. 18A illustrates a full-size image of the ABS printed part with measured surface defects, in accordance with an embodiment of the present invention.
Figure 18B:
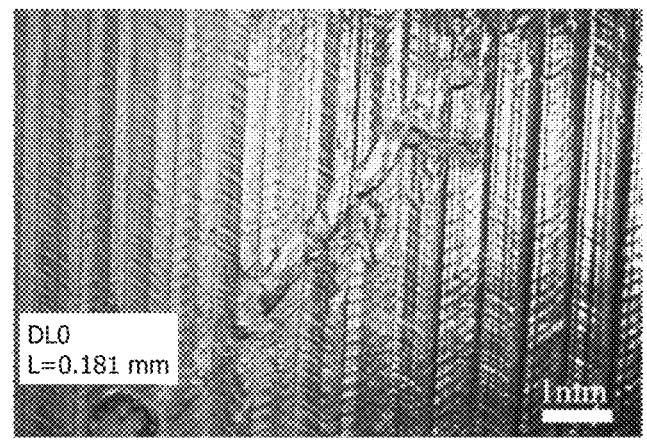
FIG. 18B illustrates a magnified 44× picture of a portion of the ABS printed part with smaller measured defect size for comparison, in accordance with an embodiment of the present invention.
Figure 19A:
FIG. 19A illustrates a zoomed in IR image of the 3D printed part matching the dimensions of FIG. 15B, in accordance with an embodiment of the present invention.
Figure 19B:
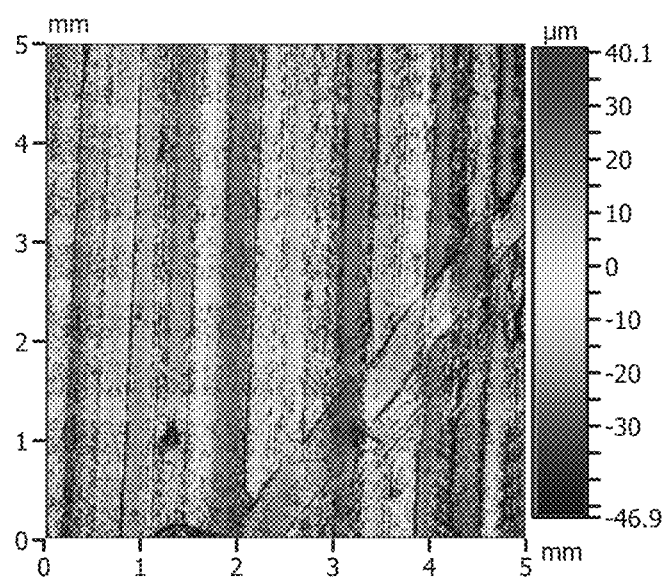
FIG. 19B is an illustration of the optical profilometry data of the surface of the 3D printed part, in accordance with an embodiment of the present invention.

When analyzed using a magnifying camera, the reflective zone is a surface hole defect approximately 1 mm in diameter as well as noticeable holes forming a line perpendicular to the filament direction, measuring approximately 1.5 mm, as seen in FIG. 18A. FIG. 18B is a focused view of the area with both defects measured in FIG. 18A and showing defects that can be seen in the IR reflected image as small as 181 μm. The size of the defect that can be seen from the reflected radiation into the IR camera depends upon the overall quality of the part surface. FIG. 19A shows a comparison between a zoomed in IR image of a portion of the 3D printed part compared to the optical profilometry data for that section, as shown in FIG. 19B. The profilometry image and the IR image are similar, showing defects microns in diameter.

The focus, so far, of reflective lines has been on hole or high spot defects, as well as the effect of the road direction relative to the heat source. There is another defect that can occur during printing, which is commonly referred to as "under extrusion". Under extrusion occurs when the filament is stretched from the nozzle, producing a road diameter that is smaller than the surrounding roads, thus leaving a gap between the roads. The 3D printed part that was analyzed for hole defects, in the prior discussed exemplary embodiment, did not have any under extrusions between the roads, therefore, in this exemplary embodiment, a 3Dn-Tabletop nScrypt printed part fabricated with a nozzle diameter of 0.2 mm and a layer height of 0.1 mm, having a known under extrusion was analyzed.

Figure 20:
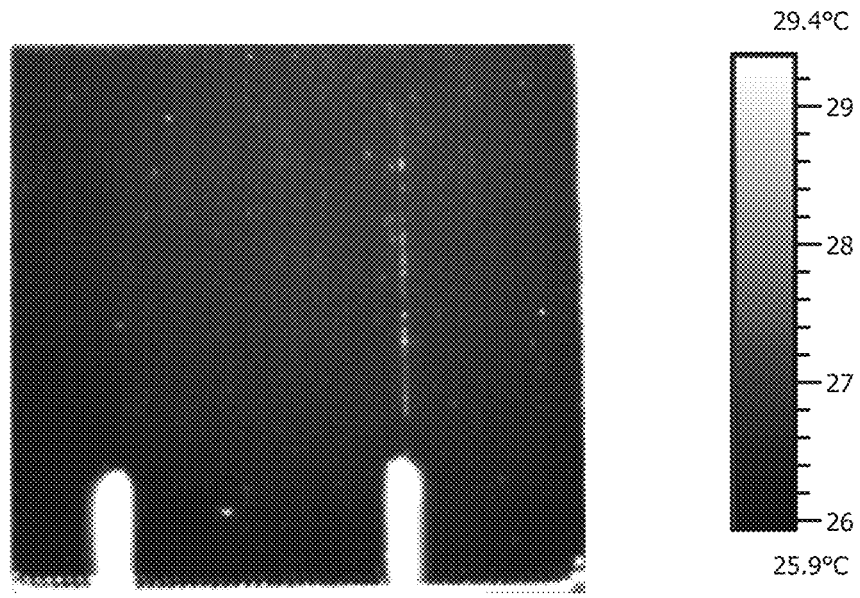
FIG. 20 is an IR image of nScrypt 3D printed part, in accordance with an embodiment of the present invention.

In this exemplary embodiment, the ABS part was thermally pulsed with the same experimental setup as the previously discussed part and FIG. 20 shows the IR image of the 3D printed part in this exemplary embodiment. The part was pulsed with the heat source parallel with the roads and in the IR image a clear vertical reflective line is visible, as well as other reflective spots throughout the surface. The two larger hotspots in the bottom of the part are marker lines and not actual defects from the printing of the part.

Figure 21:
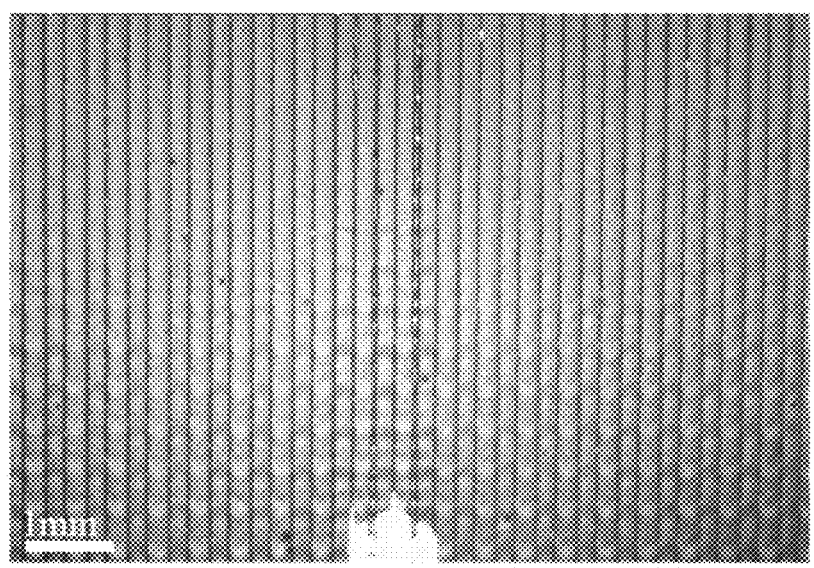
FIG. 21 is an optical image of the nScrypt 3D printed part in FIG. 16, showing an under extrusion between roads exposing the previous layer, in accordance with an embodiment of the present invention.

The bright spots related to the under extrusion are reflections from the previous laid layer. As noted earlier when the road direction is perpendicular to the heat source, the curved profile of the road's surface will reflect the radiant heat into the IR image. Since there is an under extrusion, this leaves the previous layer's roads exposed allowing them to reflect the radiant heat, thereby exposing the under extrusion. FIG. 21 shows a magnified optical image of the part containing the under extrusion. As you can see the roads that form the previous layer are visible and capable of reflecting radiant heat into the IR camera. There is also a smaller under extrusion two roads over to the left, appearing in the optical image, but it is not as extreme an under extrusion with a portion of the adjacent roads connecting.

Using Pulsed Thermography to be able to identify defects within a part after the product has been built or multiple layers have been laid is a step in the right direction for quality control in the field of AM. For online integration of a monitoring system being able to use this new form of reflective thermography from a longer pulse time, will allow the radiant heat to reflect from the heat source to the IR camera, thereby advancing the capability for quality control a step further. Defects, such as indentations, drag marks from the extruder nozzle and under extrusions can be identified by the reflections they produce, in comparison to the sound areas surrounding them. When the heat source is perpendicular to the road direction, an approximation of the road profiles can be made as well as the overall roughness of the part.

In additional embodiments, quantitative analysis methods between the surface roughness and the reflection from the roads in the IR image can be implemented. Currently, the profilometry data is only being used as visual comparison analysis. It is important to note that the sensitivity of this method as a detection method of defects depends on the overall quality of the surface; the more larger defects the part has on the surface the less sensitive the inspection is of smaller defects. Coupling the capability to monitor the surface profile with the ability for defect detection and quantification in sublayers using the PT method with a longer pulse creates multiple layers of online quality inspection.

For effective implementation of both methods, the thermal source would need to be parallel with the road direction during the build. Therefore, for the reflective thermography, either multiple bulbs surrounding the part with individual control or the ability for the thermal source to move would be the required setup. For analysis, both could be accomplished. The reflective thermography would be analyzed during the pulse simultaneously and then subsurface defects after the pulse would be analyzed after allowing time for the peak contrast slopes to occur. Ultimately, the dual method will greatly minimize the chance of defects arising in final products after completion of the build.

In various embodiments, present invention provides a system and method for using both reflected and absorbed light to get dual information about the surface and subsurface of an ABS 3D printed part by orienting the light sources and the camera so that the incident light on the default surface does not reflect specularly into the IR sensor. The IR reflected light is used to detect fine surface roughness (smaller than the lines of the deposition paths) and to detect small gaps in the surface that may reduce the strength or cause other problems in the printed part, such as shorts in electrical lines printed over them. The reflected light in the infrared is then used to characterize surface features.

When parts are fabricated using Binder Jetting (BJ), there are many variables that can alter both the mechanical and thermal properties of the product. The powder size distribution can affect overall density of the part, which can have a major impact on green part strength, sintering shrinkage and thermal properties. The layer thickness and part orientation can vary. Because the binder is dropped from an inkjet head onto the part, the printing speed has mechanical effects on the final part. Additionally, binder saturation levels can affect mechanical strength, thermal diffusivity and even dimensional accuracy, depending upon the saturation levels.

Research regarding the variable BJ parameters has primary been focused on the improvement of mechanical properties and density. There has been little research on the thermal effects these parameters have on BJ parts, specifically binder saturation and curing temperatures. The ability to monitor and understand thermal properties, specifically thermal diffusivity, during the build could help in improving process parameters, such as the pre-binder heating process, which is done to help cure some of the binder before the next layer of powder is laid. Another important aspect is that once an approximate thermal diffusivity is known based on specific parameters, then future parts with the same parameters can be monitored to locate defects and quantify the defect depth. Thus, an understanding of the capabilities of using the longer pulse method of PT to compare how the curing temperature and density affect the thermal diffusivity of BJ parts and raw powder is valuable to improving the quality of BJ parts.

Using the method of PT, defects can be quantified based on the time response of the surface temperature to a specific depth. The capability of this however, is limited to the knowledge of the thermal diffusivity of the material being tested. Because the binder saturation percentage and density can vary with different parameters in BJ, the thermal diffusivity of the part being built is an unknown variable. However, if there is a known "defect" depth, the method of PT can then be used to determine the thermal diffusivity. This can be done by rearranging the defect depth quantification equations, to give thermal diffusivity:

$$\alpha = \frac{3.64L^2}{t_s \pi^2} \quad (10)$$

$$\alpha = \frac{L^2}{t_2 \pi} \quad (11)$$

with L being the known "defect" depth, $t_s$ is the peak slope contrast time and $t_2$ the log second derivative peak slope time. Either method can be used to determine the defect depth, however, it is important to note that each equation is specific to the method it is defined for. For the purposes of this exemplary embodiment, the peak temperature contrast method will be used for all the thermal diffusivity measurements. The reason for this is that a more refined model is needed to utilize the log second derivative method, as was previously discussed.

Figure 22:
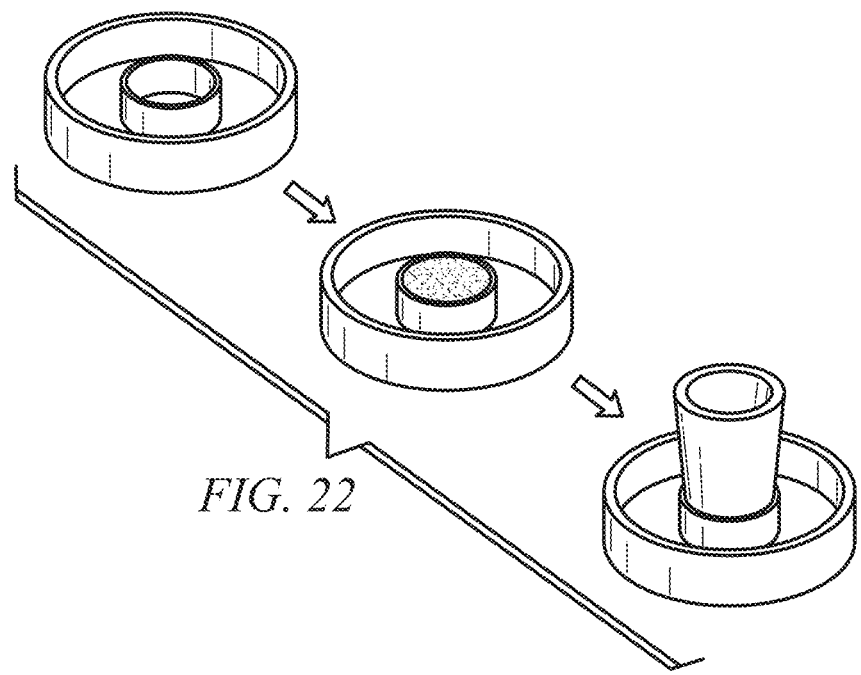
FIG. 22 is a schematic representation of the measurement process for density of raw powder, in accordance with an embodiment of the present invention.

To measure and compare the difference between the apparent and tapped density of 30 μm 420 SS powder, a fixture was made with a hollowed cylinder in the center to capture the powder, as shown in FIG. 22. For powders and granules, the apparent (bulk) density can be determined by the ratio of the mass to a given volume. The tapped density is obtained by mechanically tapping a graduated cylinder containing the sample until little further volume change is observed.

In this exemplary embodiment, the cylinder in the center has an inner diameter of 19.5 mm and a height of 9 mm. For the apparent density, the powder was poured into the container until it filled the top of the cylinder and then a blade was used to level off the surface. A metal tube was then inserted into the cylinder to separate the powder used for density measurement from the extra powder that spilled over during filling. The powder inside the center region was weighted with an Adventurer SL AS214 scale with a resolution of 0.0001 g. To calculate the powder density, the powder volume was calculated from the cylinder diameter and height.

For the tapped density, the same process was used for the weight of the powder. However, as the powder was poured into the fixture, the fixture was vibrated by hand, back and forth steadily allowing for the powder to settle. This is different than the proposed method of obtaining a tap density by tapping a cylinder 1000 to 3000 cycles at approximately 284 cycles per minute. However, for the purposes of preliminary investigation on the affects density has on thermal diffusivity, this vibrational method will suffice.

To determine the thermal diffusivity of a material using PT, there must be a known defect depth to slow down the heat conduction process and produce a thermal contrast on the surface. With raw powder however, this is especially difficult because normally, the defects that have been used are voids. For the case of raw powder, this type of defect is not possible, as the powder would simply fill the void space, as there is no mechanical structure to the powder. Therefore, to measure the thermal diffusivity, a fixture was made to support the powder and simulate the defect. The fixture was FDM printed Polylactic acid (PLA), the other most common material printed with the FDM process, next to ABS. The benefit of using PLA as the fixture (and known defect depth) is that the material has a very low thermal diffusivity of $5.556 \times 10^{-8}$ (m$^2$ s$^{-1}$). The benefit of having a very small thermal diffusivity material as the fixture and known defect depth is that it increases the possibility of a thermal contrast after the pulse. If the thermal diffusivity of two materials are similar, then the heat transfer rate doesn't slow down, and no thermal contrast is produced on the surface. Thus, the larger the difference in thermal diffusivities between the material and the defect, the larger the thermal contrast.

Figure 23:
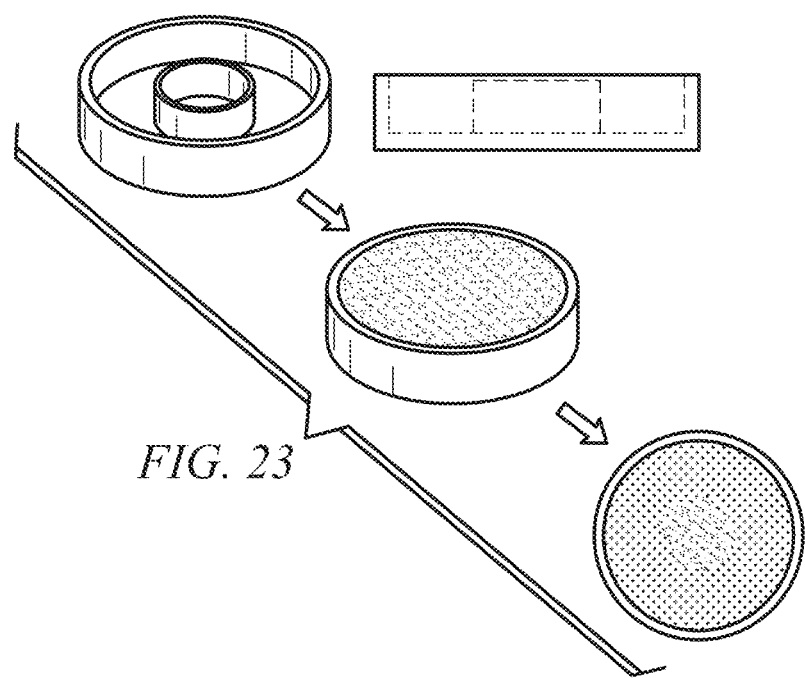
FIG. 23 is a schematic representation of thermal diffusivity measurement process, in accordance with an embodiment of the present invention.

To obtain thermal diffusivity measurements, the same process is used to create the apparent and tapped density. However, this time the powder was leveled off at the top of the fixture as seen in FIG. 23, thereby creating the defect in the center. To maximize the thermal contrast even further and to ensure that no powder falls between the roads of the FDM printed part, a piece of clear tape was placed over the defect. The thickness of the tape was 0.045 mm therefore, for the thermal diffusivity calculations, 0.955 mm was the actual defect used in the calculations.

Figure 24:
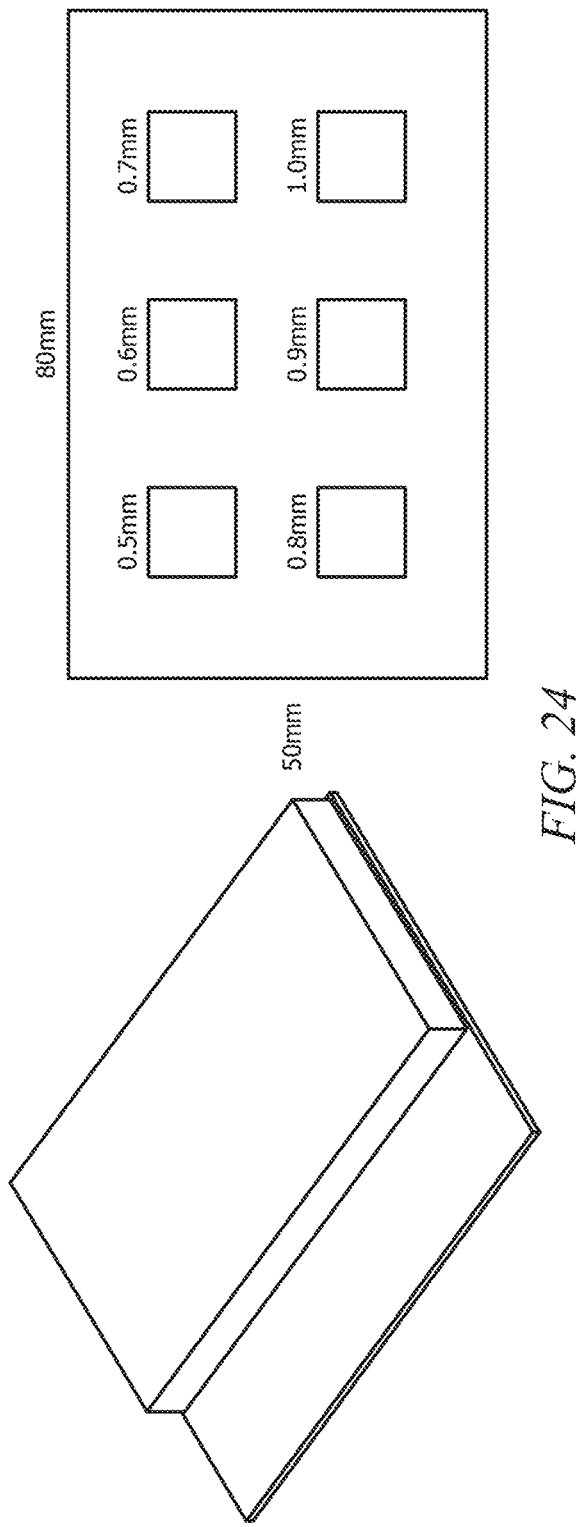
FIG. 24 is an illustration of a Binder Jet (BJ) part to be used for thermal diffusivity testing of the material with different curing temperatures, in accordance with an embodiment of the present invention.

To understand the effect that curing temperature has on the thermal diffusivity of a BJ green part, two parts made of 420SS with dimensions as seen in FIG. 24 were built on an ExOne Innovent 3D printer. The same parameters were used for each part to ensure that the only variable was the post process curing temperature. The parameters can be seen in Table III.

TABLE III

Build Parameters for Thermal Diffusivity Testing of Binder Jet Parts

| | | |
|---|---|---|
| Drying Time (s) | | 12 |
| Emitter Output (%) | | 100 |
| Target Bed Temp. (°C.) | | 40 |
| Recoat Speed (mm/s) | | 90 |
| Oscillator Speed (rpm) | | 2200 |
| Roller Traverse Speed (mm/s) | | 5 |
| Roller Rotation Speed (rpm) | | 300 |
| Desired Saturation (%) | | 60 |
| Layer Thickness (μm) | | 100 |
| Curing Temperature (°C.) | 165 | 185 |
| Curing time (hours) | | 4 |

The known 8×8 mm defect depths of each part ranged from a depth of 0.5-1.0 mm and each defect was used to calculate thermal diffusivity. Multiple defect depths were used to understand if there was any effect on the calculated diffusivity with increased layers as each depth is separated by one-layer thickness. To ensure accurate calculated thermal diffusivities, the deeper defects (0.9-1.0 mm) were used to calculate the thermal diffusivity first, then the maximum allowable pulse lengths were calculated for the rest of the defect depths. With the known maximum allowable pulse lengths for each depth, thermal diffusivities were calculated.

Figure 25:
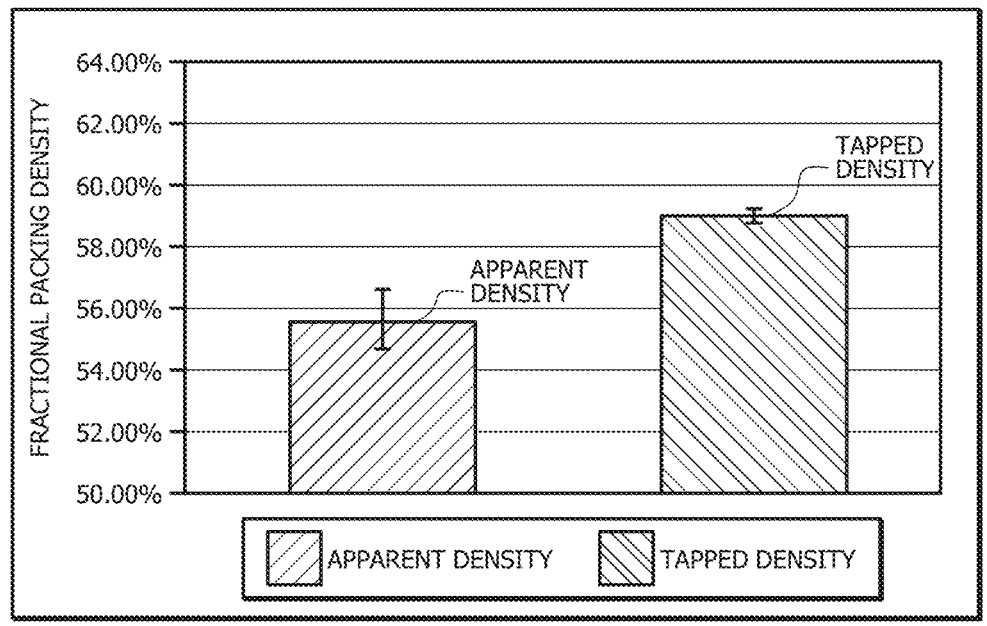
FIG. 25 is an illustration of a fractional packing density comparison between apparent and tapped density of 420 SS powder, in accordance with an embodiment of the present invention.

The density measurement results can be seen in FIG. 25. The apparent fractional packing density averaged approximately 55% of the overall density for 420 SS of 7740 (kg m$^{-3}$). In comparison the tapped fractional packing density averaged 59% of the overall density. This is in close relation to the tap density for monosized spherical powder of 60-64% obtained using an alternative method known in the art. If the other method had been used, an increase in tap density may have been seen, however, this 4% difference is sufficient for thermal diffusivity comparison purposes.

It can be seen from FIG. 25 that the tapped density of raw 420 SS powder has a larger thermal diffusivity. The density increase was approximately 4%, however, from apparent to tap density, the average thermal diffusivity increases approximately 23%. With a specific heat remaining constant, this means that the thermal conductivity increased over 30% between the two densities. The significant increase in thermal conductivity and diffusivity is because with the tap density, the interstitial void spaces between the powder particles is minimized, thus increasing the contact area between particles. The increase in contact area allows for a faster conductive heat transfer rate through the powder down to the defect depth.

Figure 26:
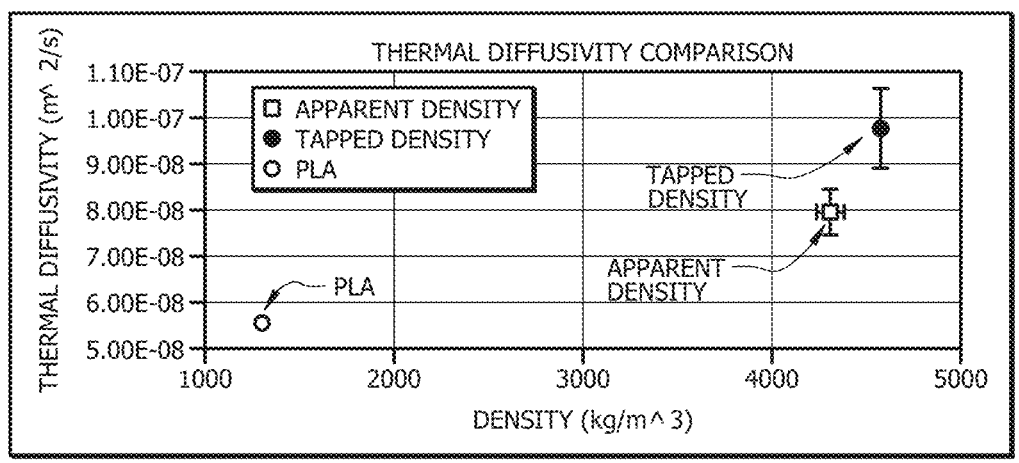
FIG. 26 is an illustration of a thermal diffusivity comparison between apparent and tap density of raw 420 SS powder, in accordance with an embodiment of the present invention.
Figure 27:
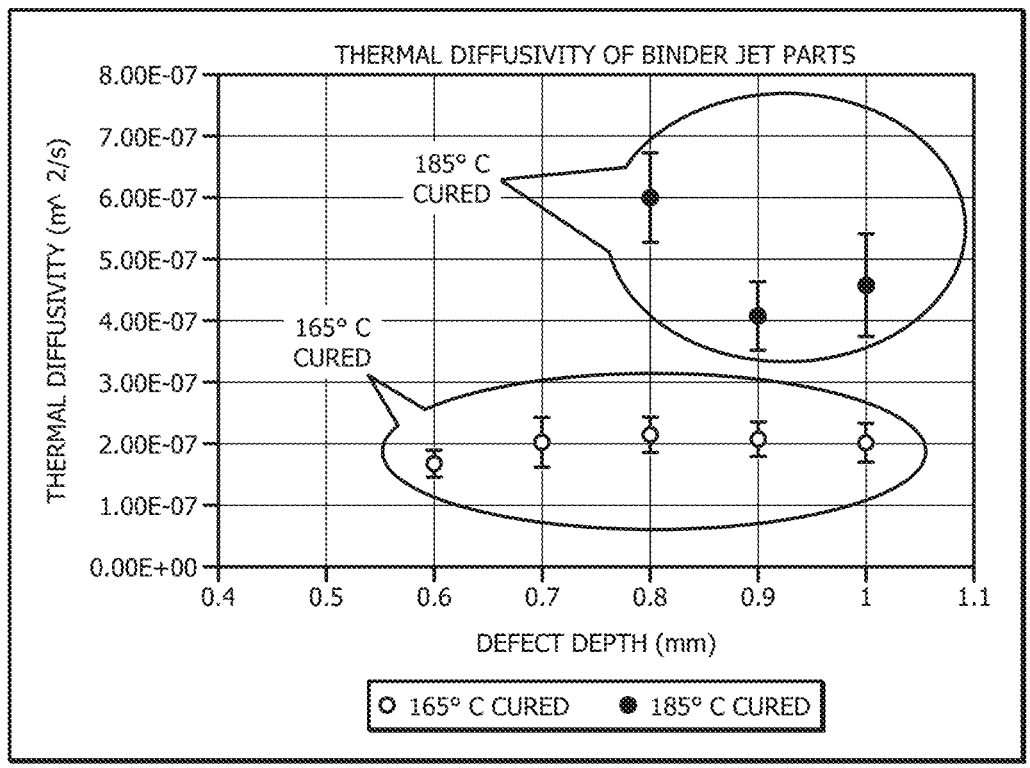
FIG. 27 is an illustration of a thermal diffusivity comparison between two binder jet parts, one cured at 165° C. and the other at 185° C., in accordance with an embodiment of the present invention.

Pulse flashes ranging from 0.6 to 1.0 s were used to thermally excite each part. Once an average thermal diffusivity was calculated for the deeper defects, the maximum allowable pulse length was used for each of the shallower defects to calculate thermal diffusivity. The results can be seen in FIG. 26. For the 165° C. cured part, the thermal diffusivity was small enough that all the defect depths, except for 0.5 mm, were able to be accurately calculated within the range of pulse lengths. However, the significant increase in thermal diffusivity from curing the part at 185° C. only allowed for the 0.8-1.0 mm defects to be used for thermal diffusivity calculation. To measure the shallower defects due to the increase in thermal diffusivity, shorter pulse lengths must be used as not to exceed the maximum allowable pulse length. The reason for the increase in thermal diffusivity when curing at 185° C. is believed to be because the increase in temperature is needed for the binder to fully set among the powder particles in the part. At 185° C., the fully set binder becomes crosslinked between the powder particles thus minimizing the surface contact heat resistance that occurs between powders simply touching. In turn, increasing the heat conduction mechanism within the part. FIG. 27 is an illustration of a thermal diffusivity comparison between two binder jet parts, one cured at 165° C. and the other at 185° C., in accordance with an embodiment of the present invention.

Figure 28:
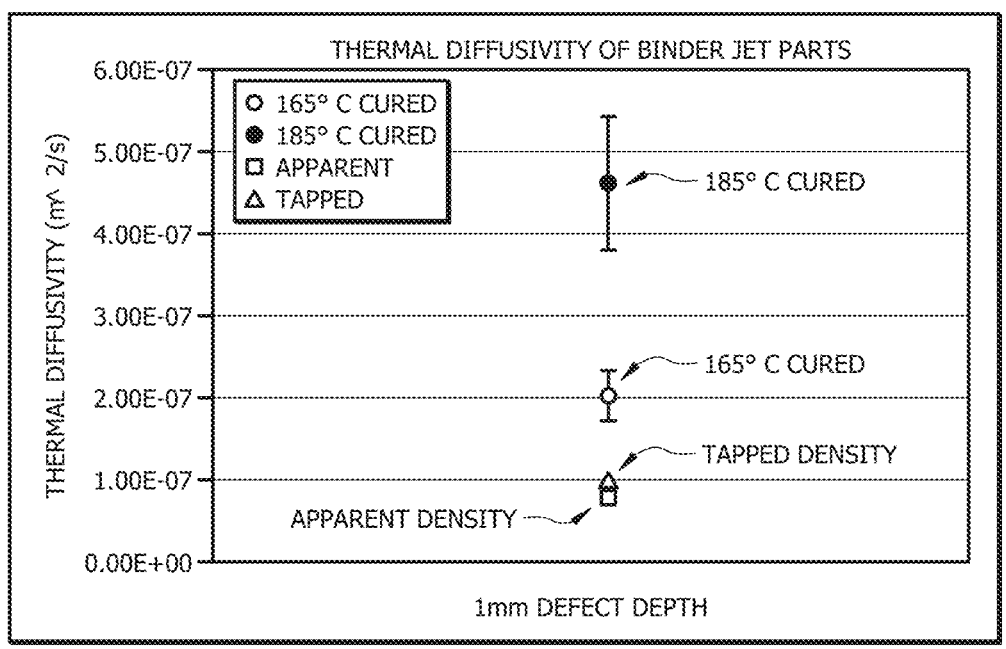
FIG. 28 is an illustration of a comparison of thermal diffusivity between raw powder and cured green parts, in accordance with an embodiment of the present invention.

The overall average thermal diffusivity of the 185° C. cured part is approximately 1.5 times larger (150%) than the thermal diffusivity of the part cured at 165° C. In comparison, the density only increased the thermal diffusivity of raw powder by 22%. FIG. 28 shows how critical the curing temperature is to thermal diffusivity as the increase due to temperature difference is more than the increase from raw powder to the 165° C. cured part.

Based on the results, using the longer pulse method of PT, thermal diffusivity values of BJ parts can be calculated based on a known defect (feature) depth. It is important to ensure that when using the longer pulse method, that the pulse length does not exceed the maximum allowable pulse length. Thus, for quantification of thermal diffusivity, deeper defects are ideal as the pulse times have a much larger range. The 4% increase between apparent and tapped density had a 22% increase in thermal diffusivity due to the increased contact points between the powder particles. Yet the curing temperature had the biggest impact on thermal diffusivity. Causing an increase in thermal diffusivity of approximately 150% between 165° C. curing temperature and 185° C.

Understanding how the BJ process parameters effect the thermal diffusivity of the green part could have significant quality benefits. In addition to detecting defects, systematic variation in packing density and binder saturation can be monitored and quantified during the build. Parameters such as drying time or bed temperature can be optimized, or even close loop controlled, to increase build times and minimize energy use.

The present invention allows for the use of lower cost, slow response, bulbs that have less demanding power supply requirements, thereby reducing the overall cost of the monitoring system. Such an implementation is feasible due to the relatively low thermal conductivity of the components being printed. Ongoing work includes, providing patterned heating of the top surface, utilize the evolution of this pattern on the top surface to identify variations in the properties of the material in the plane, extracting thermal diffusivity data from points on the plane using this approach and the estimation of other properties of interest in specific applications based on their correlation with thermal diffusivity. Potential parameters of interest include, relative density of a porous material or powder, electrical conductivity, modulus of elasticity and strength.

Hardware and Software Examples

The various techniques described herein can be implemented in connection with hardware or software or, where appropriate, with a combination of both. Thus, the methods and system described herein, or certain aspects or portions thereof, can take the form of program code (i.e., instructions) embodied in tangible media, such as hard drives, solid state drives, or any other machine-readable storage medium, wherein, when the program code is loaded into and executed by a machine, such as a computing device, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations.

The invention can also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing the invention. When implemented on a general-purpose processor, the program code combines with the processor to provide a unique apparatus that operates to invoke the functionality of the invention. Additionally, any storage techniques used in connection with the invention can be a combination of hardware and software.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. A method for monitoring a layer-based manufacturing process, the method comprising:
   exposing a surface layer of a 3D part undergoing layer-based manufacturing to a thermal energy pulse from a thermal energy source, the thermal energy pulse having a pulse duration that is based upon a thermal diffusivity of a material of the 3D part and a depth of a subsurface defect being detected in the 3D part;
   measuring a surface temperature of the surface layer of the 3D part with an infrared (IR) camera, in response to absorption of the thermal energy pulse into the 3D part, to identify a location of the subsurface defect in the 3D part; and
   calculating the depth of the subsurface defect in the 3D part.

2. The method of claim 1, wherein calculating a depth of the subsurface defect in the 3D part further comprises, performing a peak temperature contrast slope method to calculate the depth.

3. The method of claim 1, wherein calculating a depth of the subsurface defect in the 3D part further comprises, performing a log second derivative method to calculate the depth.

4. The method of claim 1, wherein measuring a surface temperature of the surface layer of the part with an infrared (IR) camera to identify a location of a subsurface defect in the 3D part, further comprises:
   measuring a surface temperature above a defect-free area of the 3D part;
   measuring a surface temperature above a defect area of the 3D part;
   determining a peak temperature contrast slope time based upon the surface temperature above a defect-free area and the surface temperature above a subsurface defect; and
   wherein calculating a depth of the subsurface defect in the 3D part, further comprises calculating the depth of the subsurface defect based upon the peak temperature contrast slope time, wherein the peak temperature contrast slope time is directly proportional to the square of the depth of the subsurface defect.

5. The method of claim 4, wherein the peak temperature contrast slope time is determined beginning at one half of the duration of the thermal pulse.

6. The method of claim 1, wherein a maximum pulse length of the thermal energy pulse is determined by:

$$\tau_s = \frac{t_p}{t_s} = \frac{\pi^2 \alpha t_p}{3.64 L^2}$$

wherein, $t_p$ is the pulse length, $t_s$ is a peak temperature contrast slope time, L is the defect depth of interest and $\alpha$ is the thermal diffusivity of the part.

7. The method of claim 1, wherein a maximum allowable pulse duration of the thermal energy pulse is determined by:

$$\tau_2 = \frac{t_p}{t_2} = \frac{\pi \alpha t_p}{L^2}$$

wherein, $t_p$ is the pulse length, $t_2$ is a peak second derivative time, L is the defect depth of interest and $\alpha$ is the thermal diffusivity of the part.

8. The method of claim 1, wherein the pulse duration comprises a range of pulse durations.

9. The method of claim 1, further comprising, for each layer of the layer-based manufacturing process:
   orienting the thermal energy source and the IR camera to minimize specular reflections from a defect-free surface area of the 3D part from reaching the IR camera, in response to the thermal energy pulse;
   blocking the thermal energy pulse from the part following exposing the surface layer of a 3D part undergoing layer-based manufacturing to the thermal energy pulse; and
   detecting specular reflections from a surface defect on a layer of the 3D part at the IR camera to identify a location of the surface defect on the layer of the 3D part.

10. The method of claim 9, wherein the layer-based manufacturing process is a Fused Deposition Modeling (FDM) process resulting in a plurality of deposition roads and wherein the thermal energy source is positioned in parallel with the deposition roads.

11. The method of claim 1, further comprising calculating the thermal diffusivity of the 3D part based upon one or more detected subsurface features.

12. The method of claim 11, wherein the layer-based manufacturing process comprises one or more control parameters and wherein the thermal diffusivity of the part is used to adjust the one or more control parameters.

13. The method of claim 1, wherein the layer-based manufacturing process is selected from Fused Deposition Method (FDM), Powder Bed Fusion (PBF) and Binder Jetting (BJ).

14. A method for monitoring a layer-based manufacturing process, the method comprising:
   exposing a surface layer of a 3D part undergoing layer-based manufacturing to a thermal energy pulse from a thermal energy source, the thermal energy pulse having a pulse duration that is based upon a thermal diffusivity of a material of the 3D part and a depth of a subsurface defect being detected in the 3D part, wherein the thermal energy source and the IR camera are oriented to minimize specular reflections from a defect-free surface area of the 3D part from reaching the IR camera, in response to the thermal energy pulse;
   measuring a surface temperature of the surface layer of the part with an infrared (IR) camera, in response to absorption of the thermal energy pulse into the 3D part, to identify a location of a subsurface defect in the 3D part;
   calculating the depth of the subsurface defect in the 3D part;
   blocking radiant heat resulting from the thermal energy pulse from reaching the 3D part following exposing the surface layer of the 3D part undergoing layer-based manufacturing to the thermal energy pulse; and
   for each layer of the 3D part, detecting specular reflections from a defect on the surface layer of the 3D part at the IR camera to identify a location of the surface defect on the layer of the 3D part.

15. A method for monitoring each layer in layer-based manufacturing process, the method comprising:
   orienting a thermal energy source and an IR camera relative to a 3D part undergoing a layer-based manufacturing process to minimize specular reflections from a defect-free surface area of the 3D part from reaching the IR camera;

exposing a surface layer of the 3D part undergoing layer-based manufacturing to a thermal energy pulse from the thermal energy source, the thermal energy pulse having a pulse duration that is based upon a thermal diffusivity of a material of the 3D part and a depth of a subsurface defect being detected in the 3D part;

blocking radiant heat resulting from the thermal energy pulse from reaching the 3D part following exposing the surface layer of the 3D part undergoing layer-based manufacturing to the thermal energy pulse; and detecting specular reflections from a layer of the 3D part at the IR camera to identify a location of a surface defect on the layer of the 3D part.

16. A system for monitoring a layer-based manufacturing process, the system comprising:

one or more thermal energy sources for generating a thermal energy pulse, the thermal energy pulse incident on a surface layer of a 3D part undergoing layer-based manufacturing, the thermal energy pulse having a pulse duration that is based upon a thermal diffusivity of a material of the 3D part and a depth of a subsurface defect being detected in the 3D part;

at least one infrared (IR) camera positioned to measure a surface temperature of the surface layer of the 3D part, in response to absorption of the thermal energy pulse into the 3D part, to identify a location of a subsurface defect in the 3D part; and a processor for calculating the depth of the subsurface defect in the 3D part.

17. The system of claim 16, further comprising, one or more radiant heat shields positioned between the thermal energy source and the surface of the 3D part to block radiant heat from the thermal energy source from reaching the 3D part, following the pulse duration of the thermal energy pulse.

18. The system of claim 16, wherein the one or more thermal energy sources and the at least one IR camera are oriented to minimize specular reflections from a defect-free surface area of the 3D part from reaching the IR camera in response to the thermal energy pulse; and wherein the at least one IR camera is positioned to detect specular reflections from defects on the current layer of the 3D part to identify a location of a surface defect on the layer of the 3D part.

19. The system of claim 18, wherein the at least one IR camera used to detect specular reflections is the same IR camera used to measure a surface temperature.

20. The system of claim 16, wherein the processor is further for calculating the thermal diffusivity of the part based upon one or more detected subsurface features.

21. The system of claim 20, wherein the layer-based manufacturing process comprises one or more control parameters and wherein the measured thermal diffusivity of the part is used to adjust the one or more control parameters.

22. The system of claim 16, wherein the layer-based manufacturing process is selected from Fused Deposition Method (FDM), Powder Bed Fusion (PBF) and Binder Jetting (BJ).

23. The system of claim 16, wherein the maximum allowable pulse duration comprises a range of pulse durations.

24. The system of claim 16, wherein the processor determines a maximum allowable pulse duration ($t_d$) of the thermal energy pulse by adding one half of the pulse duration $t_p$ to the calculated peak temperature $t_s$ for calculating the defect depth using a peak contrast slope method in which:

$$t_s = \frac{3.64 L^2}{\pi^2 \alpha}$$

wherein, L is a defect depth of interest and a is a thermal diffusivity of the part.

25. The system of claim 16, wherein the processor determines a maximum allowable pulse duration ($t_d$) of the thermal energy pulse by adding one half of the pulse duration $t_p$ to the calculated peak temperature $t_2$ for calculating the defect depth using a log second derivative method in which:

$$t_2 = \frac{L^2}{\pi \alpha}$$

wherein, L is the defect depth of interest and a is the thermal diffusivity of the part.

26. The system of claim 16, wherein the one or more thermal energy sources are halogen bulbs.

27. A system for monitoring each layer in a layer-based manufacturing process, the system comprising:

one or more thermal energy sources positioned to expose a surface layer of a 3D part undergoing layer-based manufacturing to a thermal energy pulse, the thermal energy pulse having a pulse duration that is based upon a thermal diffusivity of a material of the 3D part and a depth of a subsurface defect being detected in the 3D part;

one or more radiant heat shields positioned between the thermal energy source and the surface of the 3D part to block radiant heat from the thermal energy source from reaching the 3D part, following the pulse duration of the thermal energy pulse; and at least one infrared (IR) camera, wherein the one or more thermal energy sources and the at least one IR camera are oriented to minimize specular reflections from a defect-free surface area of the 3D part from reaching the IR camera in response to the thermal energy pulse and wherein the at least one IR camera is positioned to detect specular reflections from defects on the surface layer of the 3D part to identify a location of a surface defect on the layer of the 3D part.

* * * * *